United States Patent [19]

Shiratsuchi et al.

[11] Patent Number: 5,212,051
[45] Date of Patent: May 18, 1993

[54] PHOTOGRAPHIC ELEMENT WITH CELLULOSE DERIVATIVE POLYMER

[75] Inventors: Kentaro Shiratsuchi; Hideki Takaki, both of Kanagawa, Japan

[73] Assignee: Fuji Photo Film Co., Ltd., Kanagawa, Japan

[21] Appl. No.: 719,433

[22] Filed: Jun. 24, 1991

[30] Foreign Application Priority Data

Jun. 26, 1990 [JP] Japan .................. 2-167961

[51] Int. Cl.⁵ .................. G03C 5/54; G03C 1/46; G03C 7/20
[52] U.S. Cl. .................. 430/449; 430/215; 430/216; 430/536; 430/641; 430/227; 428/521; 428/532; 525/54.3
[58] Field of Search ............... 430/215, 216, 536, 641, 430/449, 227; 428/521, 532; 525/54.3

[56] References Cited

U.S. PATENT DOCUMENTS

| | | | |
|---|---|---|---|
| 3,765,885 | 10/1973 | Bedell | 430/216 |
| 4,009,030 | 2/1977 | Abel | 430/215 |
| 4,201,587 | 5/1980 | Bedell et al. | 430/215 |
| 4,916,044 | 4/1990 | Tomiyama | 430/216 |

FOREIGN PATENT DOCUMENTS 2018450 10/1979 United Kingdom .

OTHER PUBLICATIONS

European Search Report 91 11 0492, Dec. 9, 1991, Magrizos S. The Hague.
Patent Abstracts of Japan, vol. 14, No. 279 (P-1062) [4222] Jun. 15, 1990.

Primary Examiner—Richard L. Schilling
Attorney, Agent, or Firm—Sughrue, Mion, Zinn, Macpeak & Seas

[57] ABSTRACT

A photographic element comprising a support having thereon at least one layer comprising a polymer obtained by copolymerizing a repeating unit represented by the following general formula (I) and a copolymerizable cellulose derivative represented by the following general formula (II):

(I)

wherein A represents a repeating unit derived from an ethylenically unsaturated monomer having —COOH group, —SO$_3$H group or —PO(OH)$_2$ group in the molecular structure; and B represents a repeating unit derived from a copolymerizable ethylenically unsaturated monomer;

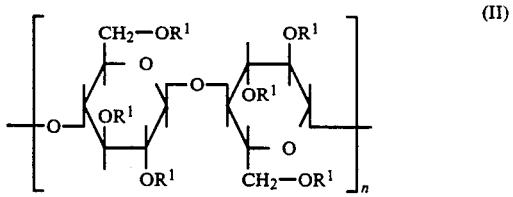

(II)

wherein (R$^1$)s each independently represents (i) a hydrogen atom, (ii) a monovalent organic bonding group such as an ester group or an ether group or (iii) a monovalent organic bonding group represented by the following general formula (III), with the proviso that (R$^1$)s do not all hydrogen atom at the same time; and n represents a number of 20 to 800;

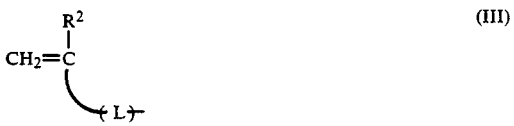

(III)

wherein R$^2$ represents hydrogen atom or an alkyl group having 1 to 6 carbon atoms; and L represents a bivalent organic bonding group, and wherein the percentage by weight of the component represented by general formula (I) in the copolymer is from 5 to 95; the percentage by weight of the component represented by general formula (III) based on the weight of the component represented by general formula (II) is from 0.00001 to 10; x and y represent each the percentage by weight of each monomer component in the copolymer and x is in the range of 1 to 95 and y is in the range of 5 to 99.

6 Claims, No Drawings

PHOTOGRAPHIC ELEMENT WITH CELLULOSE DERIVATIVE POLYMER

FIELD OF THE INVENTION

This invention relates to a photographic element, and more particularly to a photographic element comprising a support having thereon a layer which forms a temporary barrier to the diffusion (i.e., the penetration) of an alkaline processing composition present in photographic layers. The temporary barrier comprises a novel polymer material.

BACKGROUND OF THE INVENTION

In conventional photography and in diffusion transfer photographic elements, it is known to provide a temporary barrier between layers through which processing solutions penetrate. A neutralization layer for stopping development and stabilizing images may be provided in photographic materials suitable for diffusion transfer processes in particular. It is well known that a temporary barrier layer may function as a timing mechanism (timing layer), for example, between the neutralization layer and a silver halide emulsion layer to prevent maximum density from being lowered by too rapid a neutralization of the developing solutions in the neutralization layer. This enables processing at a high pH to be continued for a predetermined period of time, before the neutralization of developing solutions (alkaline processing compositions) is initiated in the neutralization layer.

Generally, the development reaction of silver halide photography proceeds slowly at a low temperature, while the reaction proceeds rapidly at a high temperature. Accordingly, when a diffusion transfer process is utilized for instant photography, development is carried out not at a controlled temperature as in general photography, but at various temperatures. As a result, it is very important that photographic elements be capable of controlling the neutralization reaction of a developing solution according to the temperature so as to, (1) expedite the neutralization reaction of the developing solution at high temperatures at which the development reaction proceeds rapidly, and (2) allow the neutralization reaction of the developing solution to proceed slowly at low temperatures at which the development reaction proceeds slowly to obtain a good image even when the development temperature is changed.

In another embodiment, the temporary barrier layer is used as an interlayer for controlling the development of the silver halide emulsion of each light-sensitive layer. It is desirable that the barrier layer does not interfere with the diffusion of dyes after that layer has functioned as a short-time barrier to permit only the development of a particular layer.

When there is a mordant layer on a support on which silver halide emulsion layers are provided, it is desirable that the interlayer is a layer which does not function as a barrier to the penetration of water during coating and storage, so that the silver halide emulsion layers are not affected by the mordant layer, for example, during storage.

Further, it is known that in photographic elements for use in diffusion transfer processes wherein alkaline processing compositions are spread between two sheets, the sheets are provided with a temporary barrier layer to the alkaline processing compositions so that the development of the silver halide emulsions is not retarded or the alkaline processing compositions are not excessively spread as a result of the alkaline processing solutions being prematurely absorbed by the sheets.

Examples of materials used as a temporary barrier layer for the above-described purposes include the aqueous latex type polymer materials described in JP-A-53-72622 (the term "JP-A" as used herein means an "unexamined published Japanese patent application"), JP-A-54-138432, JP-A-54-138433, JP-A-55-70839, U.S. Pat. Nos. 4,250,243 and 4,199,362. Examples of the materials used as timing layers which can be coated by organic solvents include the organic solvent-coatable latex type polymer materials described in JP-A-56-25735 and JP-A-56-97346, $\beta$-elimation type polymer materials described in JP-A-55-121438, U.S. Pat. Nos. 4,288,523, 4,426,481, 4,391,895 and 4,297,431, JP-A-59-136732 and JP-A-59-212836, ring opening type polymer materials having a lactone ring on a side chain described in JP-A-57-141634 and ring opening type polymer materials having a lactone ring in its main chain described in JP-A-55-54312 and JP-A-58-125037. Further, U.S. Pat. Nos. 4,061,496 and 4,357,392 disclose timing layers composed of two layers consisting of a layer comprising an aqueous latex type polymer material and a polymer layer coated with an organic solvent.

Further, JP-A-55-41490 discloses graft copolymers. However, the reaction system which generates a radical in the backbone chain must be an aqueous system from the viewpoint of easy synthesis. Accordingly, the polymers to be used are limited to those whose backbone chain is highly water-soluble or water-swellable. Furthermore, JP-A-49-22935 discloses temporary barrier layers composed of a combination of a developing solution-impermeable matrix (e.g., a butyl acrylate layer) comprising an aqueous film-forming synthetic polymer dispersion and a dispersion phase comprising a developing solution-penetrable material (e.g., polyacrylamide). However, there are the disadvantages that the combination is limited to an aqueous system/aqueous system, and the combinations capable of forming a uniform film are a little.

However, there is often the problem that when these compounds are coated on multi-layer photographic materials, the coated films are brittle and can not withstand repeated bending. Further, this problem is often so serious that the coated films are cracked or peeled off because of the bending after development. Furthermore, there is the problem that such temporary barrier layers comprising a two layer structure cause an increase in production costs even without the problem of brittleness.

SUMMARY OF THE INVENTION

An object of the present invention is to provide a photographic element having a temporary barrier layer which is excellent in processing temperature characteristics as well as in resistance to bending.

Another object of the present invention is to provide a photographic element for use in diffusion transfer processes, which is excellent in processing temperature characteristics as well as in resistance to bending.

Still another object of the present invention is to provide a photographic element for use in diffusion transfer processes, which has a temporary barrier layer comprising a single layer structure and gives an image of good quality.

The present inventors have found that the above-described objects of the present invention can be achieved by a photographic element comprising a support having thereon at least one layer comprising a copolymer obtained by copolymerizing a repeating unit represented by the following general formula (I) and a copolymerizable cellulose derivative represented by the following general formula (II):

  (I)

wherein A represents a repeating unit derived from an ethylenically unsaturated monomer having a —COOH group, a —SO$_3$H group or a —PO(OH)$_2$ group in the molecular structure; and B represents a repeating unit derived from a copolymerizable ethylenically unsaturated monomer;

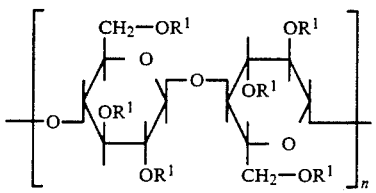  (II)

wherein (R$^1$)s each independently represents (i) a hydrogen atom, (ii) a monovalent organic bonding group such as an ester group or an ether group or (iii) a monovalent organic bonding group represented by the following general formula (III), with the proviso that (R$^1$)s do not all represent hydrgen atoms at the same time; and n represents a number of 20 to 800;

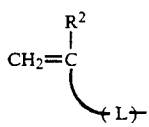  (III)

wherein R$^2$ represents hydrogen atom or an alkyl group having 1 to 6 carbon atoms; and L represents a bivalent organic bonding group, and wherein the percentage by weight of the component represented by general formula (I) in the copolymer is from 5 to 95 (%); the percentage by weight of the component represented by general formula (III) based on the weight of the component represented by general formula (II) is from 0.00001 to 10 (%); x and y represent each the percentage by weight of each monomer component in the copolymer and x is in the range of 1 to 95 (%) and y is in the range of 5 to 99 (%).

Preferably, the photographic element is a photographic element for use in diffusion transfer process.

DETAILED DESCRIPTION OF THE INVENTION

The present invention will be illustrated below in more detail.

The repeating unit represented by general formula (I) is illustrated below in more detail:

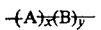  (I)

wherein A represents a repeating unit derived from an ethylenically unsaturated monomer having —COOH group, —SO$_3$H group or —PO(OH)$_2$ group in the molecular structure. Preferred examples of such an ethylenically unsaturated monomer include, but are not limited to, the following compounds:

  (1)

  (2)

  (3)

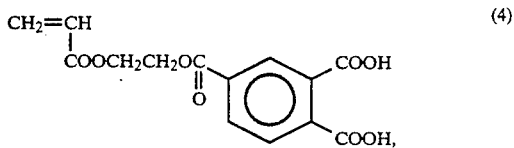  (4)

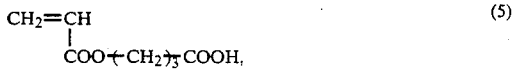  (5)

  (6)

  (7)

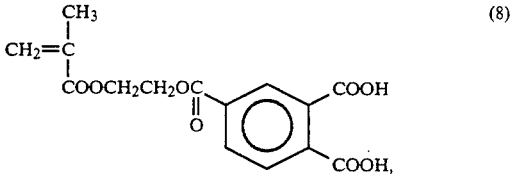  (8)

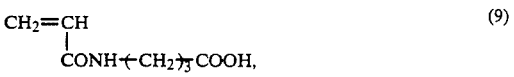  (9)

  (10)

  (11)

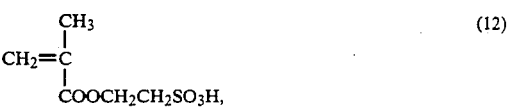  (12)

  (13)

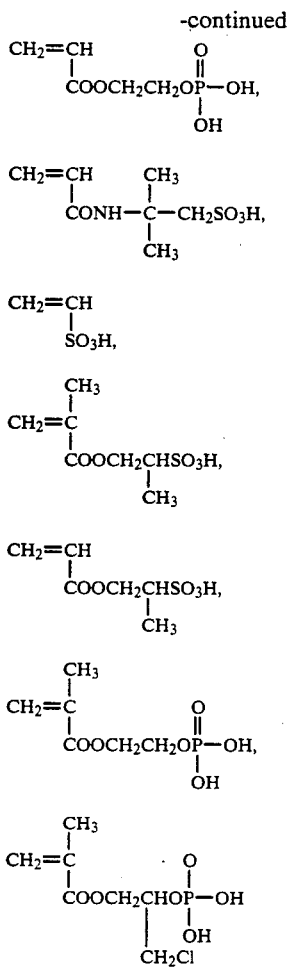

These monomers may be used either alone or in a mixture of two or more. Among these monomers, acrylic acid and methacrylic acid are particularly preferred as the ethylenically unsaturated monomers comprising A.

B represents a repeating unit derived from a copolymerizable ethylenically unsaturated monomer.

Examples of the ethylenically unsaturated monomer unit represented by B in the polymer which are preferably used in the present invention include those derived from copolymerizable unsaturated monomers such as ethylene, propylene, 1-butene, isobutene, styrene, chloromethylstyrene, hydroxymethylstyrene, α-methylstyrene, vinyltoluene, N-vinylacetamide, N-vinyl-pyrrolidone, monoethylenically unsaturated esters of aliphatic acids (e.g., vinyl acetate, allyl acetate), maleic anhydride, esters of ethylenically unsaturated monocarboxylic acids or dicarboxylic acids (e.g., n-butyl acrylate, n-hexyl acrylate, hydroxyethyl acrylate, methyl methacrylate, n-butyl methacrylate, benzyl methacrylate, hydroxyethyl methacrylate, chloroethyl methacrylate, methoxyethyl methacrylate, phthalimidomethyl acrylate, phthalimidomethyl methacrylate, maleimidomethyl acrylate, maleimidomethyl methacrylate, cyanoethyl acrylate, cyanoethyl methacrylate, phenyl acrylate, phenyl methacrylate, dimethyl itaconate), ethylenically unsaturated monocarboxylic or dicarboxylic acid amides (e.g., acrylamide, N-dimethylacrylamide, N-methylol acrylamide, N-(N,N-dimethylaminopropyl-)acrylamide, N,N,N-trimethyl-N-(N-acryloylisopropyl-)ammonium p-toluenesulfonate, acryloylmorpholine, methacrylamide, N,N-dimethyl-N'-acryloyl-propanediaminepropionatobetaine, N,N-dimethyl-N'-methacryloylpropanediamineacetatobetaine), etc.

The B component is chosen so as to control the properties (e.g., solubility, glass transition point, ionizability, hydrophobicity, hydrophilicity, penetrability of alkaline processing compositions, etc.) of the polymers of the present invention. B may be either one monomer or a combination of two or more monomers and is useful for controlling solubility or penetrability of alkaline processing compositions. For example, when the polymer is as a timing layer, it is necessary that the time taken serving as a temporary barrier layer is relatively long so that either a hydrophobic monomer unit (e.g., styrene, methyl methacrylate, butyl acrylate, etc.) is used as B or the proportion represented by the hydrophobic monomer unit is increased when two or more monomer units are used as B. When processing temperature characteristics are to be improved, a monomer unit having appropriately high reaction activation energy (e.g., phthalimidomethyl (meth)acrylate, phenyl (meth)acrylate, cyanoethyl (meth)acrylate, etc.) is used. Phthalimidomethyl (meth)acrylate can be easily synthesized by the method described in JP-A-59-202463. On the other hand, when the temporary barrier time is to be shortened, for example, the polymer is used as an interlayer, a hydrophilic monomer unit (e.g., acrylamide) is used as B or the proportion thereof is increased. Particularly preferred ethylenically unsaturated monomers from which B is derived are methyl methacrylate, hydroxyethyl methacrylate and phthalimidomethyl methacrylate.

The percentage by weight of the component unit represented by general formula (I) in the polymer is from 5 to 95, and x and y represent each the percentage by weight of each monomer component and x is from 1 to 95 and y is from 5 to 99. Particularly preferably, x is from 5 to 80 and y is from 20 to 95. $(A)_x$ and $(B)_y$ can be bound to each other by radical copolymerization method, particularly, solution copolymerization method.

The copolymerizable cellulose derivative represented by general formula (II) will be described below in more detail:

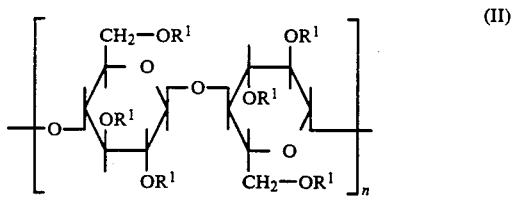

wherein $(R^1)$s each independently represents (i) a hydrogen atom, (ii) a monovalent organic bonding group such as an ester group or an ether group, or (iii) a monovalent organic bonding group having an ethylenically unsaturated group represented by the following general formula (III), with the proviso that $(R^1)$s do not all represent hydrgen atoms at the same time; and n is a number of 20 to 800, preferably a number of 100 to 500. The copolymerizable cellulose derivative represented by general formula (II) can be prepared in a uniform system from an organic solvent solution of a cellulose derivative. Further, an ethylenically unsaturated group can be introduced into the hydroxyl groups of the cellulose by the methods described in A. A. Berlinetc, *J. Gen. Chem. USSR.*, 21, 1383 (1951), U.S. Pat. No. 2,789,030, Temin, etc.; *Ind. and Eng. Chem. Product,* Rand d, 11, Nr. 3,325; Hiroaki Shiba, Origakushi 14,100 (1958), etc. The percentage by weight of the group represented by general formula (III) based on the weight of the component unit represented by general formula (II) is preferably not more than 10% to prevent gelling from occurring during copolymerization.

The cellulose derivatives which can be used in the present invention include, but are not limited to: esterified products of cellulose such as acetylated products, acetylbutylated products, acetylpropionylated products, nitrated products, caproylated products and benzoylated products of cellulose and halt esterified products of maleic anhydride, succinic anhydride or phthalic anhydride with cellulose and etherified products of cellulose such as ethylated products, ethylhydroxyethylated products, hydroxypropionylated products, methylated products, benzylated products and cyanostylated products of cellulose. Among them, acetylated cellulose derivatives, acetylbutyrated cellulose derivatives, acetylpropionylated cellulose derivatives and ethylated cellulose derivatives are preferred. Degree of substitution (D.S. value) of each substituent group may be any degree in the range of $0 > D.S. \leq 3.0$, so long as cellulose can be made soluble in organic solvents. D.S. value means an average number of substituted OH groups per a unit of glucose anhydride having three OH groups. "D.S. value=0" means any OH group of the glucose unhydrides is not substituted. "D.S. value=3" means all OH groups of the glucose unhydrides are substituted.

The monovalent organic bonding group having an ethylenically unsaturated group represented by general formula (III) is illustrated below:

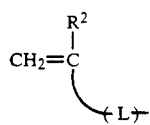
(III)

wherein $R^2$ represents hydrogen atom or an alkyl group having 1 to 6 carbon atoms; and L represents a bivalent organic bonding group. Preferably, $R^2$ is hydrogen atom or methyl group. L represent a bivalent organic group and can be represented by

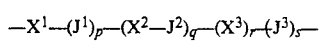

$X^1$ represents a group of

(wherein $R^3$ is hydrogen atom, an alkyl group having 1 to 4 carbon atoms or a substituted alkyl group having 1 to 6 carbon atoms), —CO—, —COO—, —NHCO—, —OCO—,

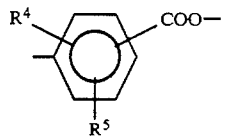

(wherein $R^4$ and $R^5$ are independently a hydrogen atom, a hydroxyl group, a halogen atom, a substituted or unsubstituted alkyl group (preferably having 1 to 18 carbon atoms), a substituted or unsubstituted alkoxy group (preferably having 1 to 18 carbon atoms), a substituted or unsubstituted acyloxy group (preferably having 1 to 18 carbon atoms) or a substituted or unsubstituted aryloxy group (preferably having 1 to 18 carbon atoms)) or a group of

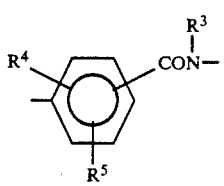

(wherein $R^3$, $R^4$ and $R^5$ are as defined above).

$X^2$ and $X^3$ may be the same or different and each represents —CO—, —SO$_2$—,

(wherein $R^6$ is hydrogen atom, an alkyl group having 1 to 6 carbon atoms or a substituted alkyl group having 1 to 6 carbon atoms),

(wherein $R^6$ is as defined above),

(wherein $R^6$ is as defined above and $R^7$ is an alkylene group having 1 to 4 carbon atoms),

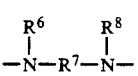

(wherein $R^6$ and $R^7$ are as defined above and $R^8$ is a hydrogen atom, an alkyl group having 1 to 4 carbon atoms or a substituted alkyl group having 1 to 6 carbon atoms), —O—, —S—,

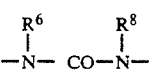

(wherein $R^6$ and $R^8$ are as defined above),

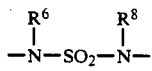

(wherein R⁶ and R⁸ are as defined above), —COO—, —OCO—,

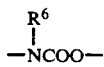

(wherein R⁶ is as defined above),

(wherein R⁶ is as defined above),

(wherein R⁶ is as defined above), etc.

J¹, J² and J³ may be the same or different and each represents an alkylene group, a substituted alkylene group, an arylene group, a substituted arylene group, an aralkylene group or a substituted aralkylene group. Examples of the alkylene group include methylene, methylmethylene, dimethylmethylene, dimethylene, trimethylene, tetramethylene, pentamethylene, hexamethylene and decylmethylene. The aralkylene group includes benzylidene. The arylene group includes phenylene groups such as p-phenylene, m-phenylene and methylphenylene.

Examples of substituent groups for the alkylene group, the arylene group, or the aralkylene group include a halogen, a nitro group, a cyano group, an alkyl group, a substituted alkyl group, an alkoxy group, a substituted alkoxy group, a group of —NHCOR¹¹ (wherein R¹¹ is an alkyl group, a substituted alkyl group, a phenyl group, a substituted phenyl group, an aralkyl group or a substituted aralkyl group), —NHSO₂R¹¹ (wherein R¹¹ is as defined above), —SOR¹¹ (where R¹¹ is as defined above), —SO₂R¹¹ (wherein R¹¹ is as defined above), —COR¹¹ (wherein R¹¹ is as defined above),

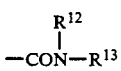

(wherein R¹² and R¹³ may be the same or different and each is a hydrogen atom, an alkyl group, a substituted alkyl group, a phenyl group, a substituted phenyl group, an aralkyl group or a substituted aralkyl group),

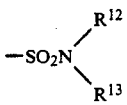

(wherein R¹² and R¹³ are as defined above), an amino group (which may be substituted by an alkyl group), a hydroxyl group and a group which forms a hydroxyl group by hydrolysis. Two or more of these substituent groups may be attached and these two or more substituent groups may be the same or different.

Examples of the substituent groups for the substituted alkyl group, the substituted alkoxy group, the substituted phenyl group and the substituted aralkyl group mentioned in the previous photograph include a hydroxyl group, a nitro group, an alkoxy group having 1 to 4 carbon atoms, a group of —NHSO₂R¹¹ (Wherein R¹¹ is as defined above), a group of —NHCOR¹¹ (wherein R¹¹ is as defined above), a group of

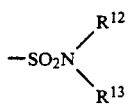

(wherein R¹² and R¹³ are as defined above), a group of

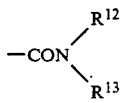

(wherein R¹² and R¹³ are as defined above), a group of —SO₂R¹¹ (wherein R¹¹ is as defined above), a group of —COR¹¹ (wherein R¹¹ is as defined above), a halogen atom, a cyano group and an amino group (which may be substituted by an alkyl group).

The letters p, q, r and s each represent 0 or 1. The percentage by weight of the component unit represented by general formula (III) based on the weight of the component unit represented by general formula (II) is from 0.00001 to 10.

Preferred examples of the monovalent bonding group having an ethylenically unsaturated group represented by general formula (III) according to the present invention include the following groups:

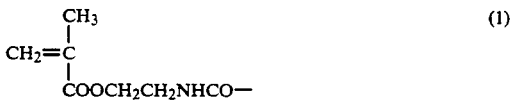

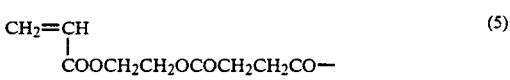

-continued (6)
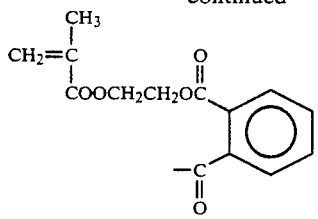

(7)
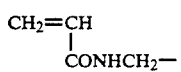

(8)
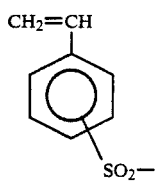

(9)
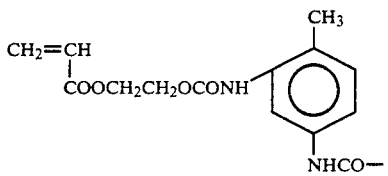

(10)
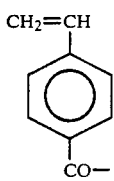

(11)

(12)
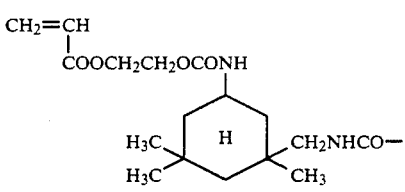

(13)
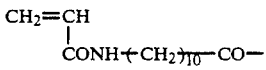

-continued

(14)
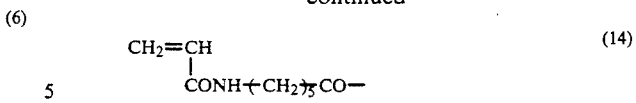

Among the above-described groups, the groups (1), (2), (3) and (4) are preferred.

Examples of the copolymerizable cellulose derivative represented by general formula (II) comprising a combination of a cellulose derivative with the monovalent organic bonding group having an ethylenically unsaturated group represented by general formula (III) include the following:

(1) Acetylcellulose (D.S.=2.4)/formula (III)-2 (10/0.05 by weight)
(2) Acetylcellulose (D.S.=2.4)/formula (III)-1 (10/0.2 by weight)
(3) Acetylcellulose (D.S.=1.9)/formula (III)-3 (10/0.1 by weight)
(4) Acetylcellulose (D.S.=2.4)/formula (III)-4 (10/0.15 by weight)
(5) Acetylcellulose (D.S.=1.9)/formula (III)-7 (10/0.4 by weight)
(6) Acetylcellulose (D.S.=2.4)/formula (III)-9 (10/0.25 by weight)
(7) Acetylcellulose (D.S.=1.9)/formula (III)-12 (10/0.2 by weight)
(8) Benzyl cellulose (D.S.=2.0)/formula (III)-1 (10/0.25 by weight)
(9) Benzyl cellulose (D.S.=1.5)/formula (III)-8 (10/0.9 by weight)
(10) Benzyl cellulose (D.S.=1.8)/formula (III)-10 (10/0.6 by weight)
(11) Ethyl cellulose (D.S.=2.2)/formula (III)-1 (10/0.4 by weight)
(12) Ethyl cellulose (D.S.=2.6)/formula (III)-6 (10/0.35 by weight)
(13) Ethyl cellulose (D.S.=2.4)/formula (III)-14 (10/0.5 by weight)
(14) Cyanoethyl cellulose (D.S.=1.5)/formula (III)-1 (10/0.3 by weight)

Among then, (2), (3) and (11) are preferred combinations.

The copolymerizable cellulose derivatives represented by general formula (II) can be synthesized by urethanation, esterification or etherification.

For example, the derivatives can be easily synthesized by using an isocyanate or an acid halide as illustrated below.

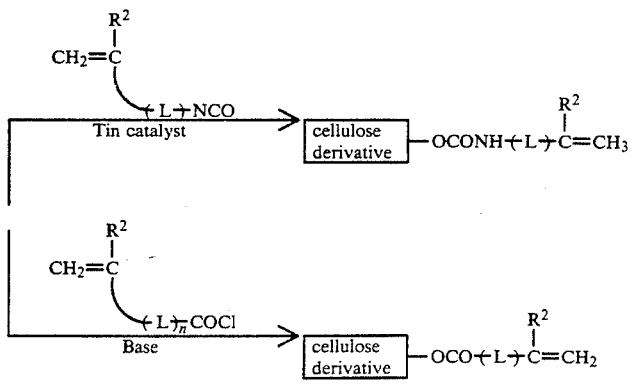

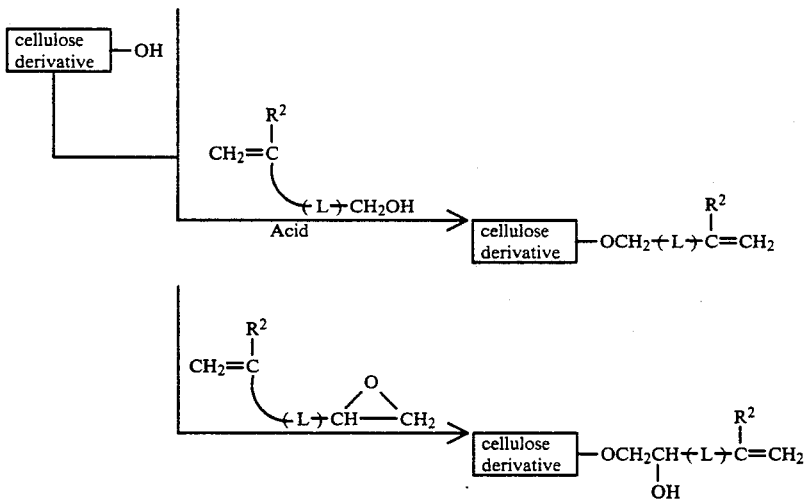

In the above formulas, $R^2$ and L are as defined above and n is 0 or 1.

A typical synthesis example of the copolymerizable cellulose derivative represented by general formula (II) is illustrated below.

SYNTHESIS EXAMPLE 1

Synthesis of Compound (2) of General Formula (II)

Eighty cc of methyl ethyl ketone, 10 g of acetylcellulose (D.S.=2.4, a product of Daicel Chemical Industries, Ltd.) and 0.1 g of dibutyldilauryltin (a product of Wako Junyaku) were placed in a reactor and heated to 70° C. with stirring. Stirring was continued at 70° C. for 2 hours to dissolve uniformly the acetylcellulose. A solution of 0.2 g of methacryloyloxyethyl isocyanate (a product of Showa Denko KK) diluted with 2 cc of methyl ethyl ketone was slowly added thereto, and further stirring was continued at 70° C. for 2 hours. The resulting viscous crystal-clear reaction solution was cooled and added to 1.5 l of methyl alcohol with stirring. The precipitated white solid polymer was collected by filtration and dried under reduced pressure at room temperature to obtain the title compound. Yield: 9.1 g.

Other compounds were synthesized in the same manner as described above.

Preferred examples of the polymer obtained by copolymerizing a repeating unit represented by general formula (I) and a copolymerizable cellulose derivative represented by general formula (II) include the following copolymers:

(1) Formula (II)-1/acrylic acid/methyl methacrylate/hydroxyethyl methacrylate copolymer (50/10/30/10 by weight);
(2) Formula (II)-2/methacrylic acid/butyl acrylate copolymer (70/8/22 by weight);
(3) Formula(II)-2/methacrylic acid/methyl methacrylate/phthalimidomethyl acrylate copolymer (70/8/14/8 by weight);
(4) Formula(II)-2/methacrylic acid/methyl methacrylate/phthalimidomethyl acrylate copolymer (70/7/11/12 by weight);
(5) Formula (II)-2/methacrylic acid/methyl methacrylate/phthalimidomethyl acrylate copolymer (30/16.3/30.3/23.3 by weight);
(6) Formula(II)-2/acryloyloxyethyl hydrogenphthalate/methyl methacrylate/phthalimidomethyl acrylate copolymer (30/35/10/25 by weight);
(7) Formula (II)-2/methacrylic acid/methyl methacrylate graft copolymer (70/7/23 by weight);
(8) Formula(II)-1/acrylic acid/methyl methacrylate/hydroxetheyl methacrylate copolymer (70/10/6/14 by weight);
(9) Formula (II)-2/2-hydroxyethylacryloyl phosphate/methyl methacrylate/hydroxyethyl methacrylate copolymer (50/12/28/10 by weight);
(10) Formula (II)-2/acrylic acid/methyl methacrylate/hydroxyethyl methacrylate copolymer (30/8/47/15 by weight);
(11) Formula(II)-2/2-acrylamido-2-methylpropanesulfonic acid/hydroxyethyl methacrylate copolymer (80/10/10 by weight);
(12) Formula (II)-3/acryloyloxyethyl hydrogenphthalate/hydroxyethyl methacrylate copolymer (70/15/15 by weight);
(13) Formula (II)-3/itaconic acid/diacetone acrylamide copolymer (70/10/20 by weight);
(14) Formula (II)-4/vinylbenzonic acid/acrylic acid/acrylamide copolymer (70/5/10/15 by weight);
(15) Formula (II)-5/acrylic acid/methylmethacrylate/hydroxyethyl methacrylate copolymer (20/10/55/15 by weight);
(16) Formula (II)-6/methacrylic acid/methyl methacrylate/hydroxyethyl methacrylate copolymer (40/10/45/5 by weight);
(17) Formula (II)-7/acrylic acid/methyl methacrylate/vinyl-pyrrolidone copolymer (70/5/5/20 by weight);
(18) Formula (II)-9/2-acrylamido-2-methylpropanesulfonic acid/diaceton acrylamide copolymer (70/6/24 by weight);
(19) Formula (II)-10/vinylbenzoic acid/acrylamide copolymer (80/10/10 by weight);
(20) Formula (II)-11/2-acrylamide-2-methylpropanesulfonic acid/methyl methacrylate/hydroxyethyl methacrylate copolymer (20/6/59/15 by weight);
(21) Formula (II)-12/acryloyloxyethyl hydrogenphthalate/methyl methacrylate/hydroxyethyl methacrylate (40/13/42/5 by weight); and

(22) Formula (II)-14/acrylic acid/methyl methacrylate/vinyl-pyrrolidone copolymer (80/5/5/10 by weight).

The polymers of the present invention can be synthesized by well-known radical polymerization (e.i., described in *Experimental Method of High Molecular Synthesis*, pp. 124~154, written by Takayuki Otsu et al (Kagaku Dojin 1972)). Solution polymerization method using an organic solvent system is particularly preferred.

In the solution polymerization method, an ethylenically unsaturated monomer from which A is derived, an ethylenically unsaturated monomer from which B is derived and a copolymerizable cellulose derivative of general formula (II) are dissolved in an appropriate solvent (e.g., organic solvents such as acetone, methyl ethyl ketone, ethyl alcohol, isopropyl alcohol, acetonitrile, dioxane, N,N-dimethylformamide, N,N-dimethylacetamide, tetrahydrofuran and ethyl acetate singly or a mixture thereof) and then subjected to solution polymerization, whereby the polymers of the present invention are obtained.

The solution polymerization is carried out in the presence of conventional radical initiator (e.g., azo initiator such as 2,2'-azobisisobutyronitrile or peroxide initiator such as benzoyl peroxide) at a temperature of generally 30° to about 100° C., preferably 40° to about 90° C.

Polymerization examples are illustrated below.

SYNTHESIS EXAMPLE 2

Synthesis of Copolymer (3)

Two hundred cc of methyl ethyl ketone, 86 cc of ethyl alcohol and 24.5 g of compound (formula (II)-2) were placed in a reactor and heated to 70° C. with stirring. Stirring was continued at 70° C. for 2 hours to dissolve uniformly compound (formula (II-(2)). Subsequently, 2.8 g of methacrylic acid (a product of Wako Junyaku KK), 4.9 g of methyl methacrylate (a product of Mitsubishi Gas Kagaku KK) and 2.8 g of phthalimidomethyl acrylate were added thereto. After deaeration with nitrogen gas, a solution of 0.34 g of dimethyl 2,2'-azobisisobutyrate dissolved in 3 cc of methyl ethyl ketone was added thereto, and stirring was continued at 70° C. for 2 hours. Thereafter, a solution of 0.34 g of dimethyl 2,2'-azobisisobutyrate dissolved in 3 cc of methyl ethyl ketone was added thereto, and further stirring was continued at 70° C. for 3 hours. The resulting viscous crystal-clear reaction solution was cooled and added to 2.5 l of water with stirring.

The precipitated white solid polymer was collected by filtration and dried under reduced pressure at room temperature to obtain the title compound.

SYNTHESIS EXAMPLE 3

Synthesis of Copolymer (4)

Two hundred cc of methyl ethyl ketone, 86 cc of ethyl alcohol and 24.5 g of compound (formula (II)-(2)) were placed in a reactor and heated to 70° C. with stirring. Stirring was continued at 70° C. for 2 hours to dissolve uniformly compound (formula (II)-(2)). Subsequently, 2.45 g of methacrylic acid, 3.85 g of methyl methacrylate and 1.4 g of phthalimidomethyl acrylate were added thereto. After deaeration with nitrogen gas, a solution of 0.34 g of dimethyl 2,2'-azobisisobutyrate dissolved in methyl ethyl ketone was added thereto and stirring was continued at 70° C. for 2 hours. Thereafter, a solution of 0.34 g of dimethyl 2,2'-azobisisobutyrate dissolved in 3 cc of methyl ethyl ketone was added thereto and further stirring was continued at 70° C. for 3 hours. The resulting viscous crystal-clear reaction solution was cooled and added to 2.5 l of water with stirring. The precipitated white solid polymer was collected by filtration and dried under reduced pressure at room temperature to obtain the title compound. Yield: 29.2 g (82%)

SYNTHESIS EXAMPLE 4

Synthesis of Copolymer (5)

Forty cc of methyl ethyl ketone, 17 cc of isopropyl alcohol and 3.7 g of compound (formula (II)-(2)) were placed in a reactor and heated to 70° C. with stirring. Stirring was continued at 70° C. for 2 hours to dissolve uniformly compound (formula (II)-(2)). Subsequently, 1.96 g of methacrylic acid, 3.64 g of methyl methacrylate and 2.8 g of phthalimidomethyl acrylate were added thereto. After deaeration with nitrogen gas, a solution of 0.16 g of dimethyl 2,2'-azobisisobutyrate dissolved in 3.8 cc of methyl ethyl ketone was added thereto and stirring was continued at 70° C. for 2 hours. Thereafter, a solution of 0.16 g of dimethyl 2,2'-azobisisobutyrate dissolved in 3.8 cc of methyl ethyl ketone was added thereto and further stirring was continued at 70° C. for 3 hours. The resulting viscous crystal-clear reaction solution was cooled and added to 2.5 l of water with stirring. The precipitated white solid polymer was collected by filtration and dried under reduced pressure at room temperature to obtain the title compound. Yield: 9.8 g (81%)

SYNTHESIS EXAMPLE 5

Synthesis of Compound (8)

Seventy cc of methyl ethyl ketone, 30 cc of ethyl alcohol and 7 g of compound (formula (II)-2) were placed in a reactor and heated to 70° C. with stirring. Stirring was continued at 70° C. for 2 hours to dissolve uniformly compound (formula (II)-(2)). Subsequently, 1 g of acrylic acid (a product of Toagosei Chemical Industry Co., Ltd.), 1.6 g of methyl methacrylate and 1.4 g of hydroxyethyl methacrylate (a product of Kyoei Yushi Kagaku) were added thereto. After deaeration with nitrogen gas, a solution of 0.1 g of dimethyl 2,2'-bisisobutyrate dissolved in 2.2 cc of methyl ethyl ketone was added thereto and stirring was continued at 70° C. for 2 hours. Thereafter, a solution of 0.1 g of dimethyl 2,2'-bisisobutyrate dissolved in 2.2 cc of methyl ethyl ketone was added thereto and further stirring was continued at 70° C. for 3 hours. The resulting viscous crystal-clear reaction solution was cooled and added to 2.5 l of water with stirring. The precipitated white solid polymer was collected by filtration and dried under reduced pressure at room temperature to obtain the title compound. Yield: 7.9 g (79%).

Other compounds were synthesized in the same manner as described above.

The copolymers of the present invention can be obtained by two steps consisting of a step wherein an organic solvent-soluble cellulose derivative is made copolymerizable as described in Synthesis Example 1 and a step wherein the resulting copolymerizable cellulose derivative and an ethylenically unsaturated monomer are copolymerized as shown in Synthesis Examples 2 to 5. The copolymers of the present invention may be synthesized in such a manner that a cellulose derivative is made copolymerizable and the resulting copolymerizable cellulose derivative as such is subjected to a copolymerization reaction in the same reactor without first isolating the resulting copolymerizable cellulose derivative.

The copolymers of the present invention have a high affinity for backbone polymers and/or branched polymers or polymers having a similar structure to those of these backbone or branched polymers. Accordingly, the blends of the copolymers of the present invention with these backbone polymers and/or these branched polymers or the polymers having a similar structure can be used.

Any rigid material such as glass and earthenware or flexible material such as paper and films can be used as supports on which layers containing the polymers of the present invention are coated. However, it is important that materials which do not cause a remarkable change in dimension during storage or processing are chosen. Such supports may be transparent or opaque. Examples of the supports include films such as polyester films, polycarbonate films, polystyrene films and films of cellulose derivatives, paper, baryta paper, coated paper such as paper coated pigments (such as titanium white) and paper laminated with polymers such as polyethylene, polystyrene and cellulose derivatives.

Any support can be used if at least a side on which a dye image-receiving layer has been coated is white and if it has sufficient whiteness and smoothness. For example, preferable supports include: polymer films treated by adding white pigments such as titanium oxide, barium sulfate or zinc oxide (having a particle size of 0.1 to 5$\mu$m) or by stretching the films to form microvoids; films composed of polyethylene terephthalate, polystyrene or polypropylene obtained by molding them into films and biaxially orienting them in a conventional manner; synthetic paper; and paper obtained by laminating both sides of the paper with polyethylene, polyethylene terephthalate or polypropylene, each such polymer containing titanium white. The supports have a thickness of 50 to 350 $\mu$m, preferably 70 to 210 $\mu$m, more preferably 80 to 150 $\mu$m. If desired, a light screening layer may be optionally provided in the support. For example, there can be used supports formed by laminating the back of a white support with polyethylene containing a light screening agent such as carbon black.

Channel black, thermal black and furnace black described in Donnet Voet "Carbon Black" Marcel Dekker, Inc. (1976) can be used as the carbon black.

Carbon black having a particle size of 90 to 1800 Å is preferred, though there is no particular limitation with regard to particle size. The amount of black pigment as a light screening agent to be added may be controlled according to the sensitivity of photographic materials to be screened, but the black pigment is preferably used in such an amount as to give an optical density of 5 to 10.

When a layer containing the polymer of the present invention is to be incorporated in an image receiving element for use in diffusion transfer processes, preferred embodiments of the image receiving layer thereof are those in which a material (called a silver depositing nucleus material or a center of development) serving as a catalyst for the reduction reaction of the water-soluble silver complexes is contained in an alkaline processing composition-penetrable matrix material. In color diffusion transfer processes, said layer is a mordant layer (dye image receiving layer) which fixes diffusing dye compounds.

DYE IMAGE RECEIVING LAYER

In the dye image receiving layer which can be used in the present invention, a mordant is contained in hydrophilic colloid. The layer may be composed of a single layer or a multi-layer wherein mordants having different mordanting powers are coated to form layers. The mordants are described in JP-A-61-252551. Polymer mordants are preferred as mordants.

The polymer mordants which are used in the present invention include polymers having secondary and tertiary amino groups, polymers having a nitrogen-containing heterocyclic ring moiety and polymers having a quaternary cationic group thereof. These polymers have a molecular weight of not less than 5,000, preferably not less than 10,000.

Examples of the mordants include: vinylpyridine polymers and vinylpyridinium cationic polymers described in U.S. Pat. Nos. 2,548,564, 2,484,430, 3,148,061 and 3,756,814; vinylimidazolium cationic polymers described in U.S. Pat. No. 4,124,386; polymer mordants capable of crosslinking with gelatin, etc. described in U.S. Pat. Nos. 3,625,694, 3,859,096 and 4,128,538 and British Patent 1,277,453; aqueous sol type mordants described in U.S. Pat. Nos. 3,958,995, 2,721,852 and 2,798,063, JP-A-54-115228, JP-A-54-145529, JP-A-54-126027, JP-A-54-155835 and JP-A-56-17352; water-insoluble mordants described in U.S. Pat. No. 3,898,088; reactive mordants capable of covalent-bonding to dyes described in U.S. Pat. Nos. 4,168,976 and 4,201,840; and mordants described in U.S. Pat. Nos. 3,709,690, 3,788,855, 3,642,482, 3,488,706, 3,557,066, 3,271,147 and 3,271,148, JP-A-53-30328, JP-A-52-155528, JP-A-53-125, JP-A-53-1024, JP-A-53-107835 and U.S. Pat. No. 2,064,802.

In addition thereto, mordants described in U.S. Pat. Nos. 2,675,316 and 2,882,156 can be used.

Among them, mordants which migrate with difficulty from one mordant layer to other layers are preferred. For example, one mordants capable of crosslinking with a matrix such as gelatin, water-insoluble mordants and aqueous sol (or latex dispersion) type mordants are preferred. Latex dispersion mordants are particularly preferred, and the particle size is 0.01 to 2$\mu$, preferably 0.05 to 0.2$\mu$.

The coated amount of the mordants are generally from 0.5 to 10 g/m$^2$, preferably from 1.0 to 5.0 g/m$^2$, more preferably from 2 to 4 g/m$^2$, depending on kinds of the mordants, amounts of quaternary cationic groups, kinds and amounts of dyes to be dealt with the mordants, and kinds of binders used.

Examples of the hydrophilic colloid used in the image receiving layer include gelatin, modified gelatin such as acylated gelatin, polyvinyl alcohol, polyacrylamide and polyvinyl pyrrolidone. Among them, gelatin is preferred.

It is desirable that a release layer is provided on the surface of the image receiving layer to prevent the processing solution from depositing on the surface of the image receiving layer when it is peeled off after the spreading of the processing solution. Preferred materials for the release layer are gum arabic, hydroxyethyl cellulose, methyl cellulose, polyvinyl alcohol, polyacrylamide, sodium alginate and the compounds described in U.S. Pat. Nos. 3,772,024 and 3,820,999 and U.K. Patent 1,360,653.

NEUTRALIZATION LAYER

A neutralization layer is used together with the layer containing the polymer of the present invention.

The neutralization layer is a layer which contains an acid material in a sufficient amount to neutralize an alkali introduced from a processing composition. Preferred examples of the acid material include materials having an acid radical having a pKa of not higher than 9 (or a precursor radial which gives such an acid radical by hydrolysis). More preferred acid materials include: higher fatty acids such as oleic acid described in U.S. Pat. No. 2,983,606; polymers of acrylic acid, methacrylic acid or maleic acid, and partial esters thereof or acid anhydrides thereof described in U.S. Pat. No. 3,362,819; copolymers of acrylic acid with acrylic esters described in French Patent 2,290,699; and latex type acid polymers described in U.S. Pat. No. 4,139,383 and *Research Disclosure* No. 16102 (1977).

In addition thereto, acid materials described in U.S. Pat. No. 4,088,493, JP-A-52-153739, JP-A-53-1023, JP-A-53-4540, JP-A-53-4541 and JP-A-53-4542 can be used.

Examples of the acid polymers include copolymers of a vinyl monomer such as ethylene, vinyl acetate, vinyl methyl ether or the like with maleic anhydride, copolymers of n-butyl ester thereof and butyl acrylate with acrylic acid and cellulose acetate hydrogen-phthalate.

The acid polymers may be used as a mixture thereof with a hydrophilic polymer. Examples of such polymers include polyacrylamide, poly-N-vinylpyrrolidone, polyvinyl alcohol (including a partially saponified product), carboxymethyl cellulose, hydroxymethyl cellulose, hydroxyethyl cellulose and polymethylvinyl ether. Among them, polyvinyl alcohol is preferred. If desired, polymers such as cellulose acetate other than hydrophilic polymers may be added to said polymer acids.

The amount of the polymer acid to be coated can be adjusted by the amount of the alkali spread on the light-sensitive element. The ratio by equivalent of the polymer acid and the alkali per unit area is preferably from 0.9 to 2.0. When the amount of the polymer acid is too small, the hue of the transferred dye is changed or the white area is stained. When the amount is too large, there are the disadvantages that the hue is changed or that the light resistance is lowered. A more preferred ratio is from 1.0 to 1.3 by equivalent. When the amount of the hydrophilic polymer is too large or too small, the quality of photograph is lowered. The ratio by weight of the hydrophilic polymer to the polymer acid is generally rom 0.1 to 10, preferably from 0.3 to 3.0.

Various additives may be contained in the layer having a neutralization function (including the layer containing the polymer of the present invention) according to the present invention for various purposes. For example, the layer may contain a conventional hardening agent to harden the layer. A polyhydroxy compound such as polyethylene glycol, polypropylene glycol or glycerol may be added to the layer to improve its brittleness. Further, antioxidants, fluorescent brighteners, bluing dyes, restrainers, and precursor thereof, etc. may be optionally added.

The polymer of the present invention can be used as a neutralization layer (as for the polymers having much acid ingredients, —(A)$_x$—), an undercoat layer, and a binder for a backing layer besides a timing layer.

When the layer containing the polymer of the present invention is used as a timing layer, there may be included used in the same timing layer or in a separate timing layer (i) a polymer which lowers alkali-penetrability such as gelatin, polyvinyl alcohol, a partially acetalized product of polyvinyl alcohol, cellulose acetate or partially hydrolized polyvinyl acetate; (ii) a latex polymer which raises activation energy of alkali penetration, obtained by copolymerizing a small amount of a hydrophilic comonomer such as acrylic acid monomer; and/or (iii) a polymer having a lactone ring.

Particularly effective are: cellulose acetate described in JP-A-54-136328, U.S. Pat. Nos. 4,267,262, 4,009,030 and 4,029,849; latex polymers prepared by copolymerized a small amount of a hydrophilic comonomer such as acrylic acid as described in JP-A-54-128335, JP-A-56-69629, JP-A-57-6843, U.S. Pat. Nos. 4,056,394, 4,061,496, 4,199,362, 4,250,243, 4,256,827 and 4,268,604; polymers having a lactone ring described in U.S. Pat. No. 4,229,516; and polymers described in JP-A-56-25735, JP-A-56-97346, JP-A-57-6842, European Patents 31,957A1, 37,724A1 and 48,412A1.

Further, the polymers described in U.S. Pat. Nos. 3,421,893, 3,455,686, 3,575,701, 3,778,265, 3,785,815, 3,847,615, 4,088,493, 4,123,275, 4,148,653, 4,201,587, 4,288,523 and 4,297,431, West German Patent Application (OLS) Nos. 1,622,936 and 2,162,277 and *Research Disclosure* 15,162, No. 151 (1976) can be used.

The timing layer formed by using these materials may be composed of a single layer or two or more layers.

Further, the timing layer comprising these materials may contain restrainers and/or precursors thereof described in U.S. Pat. No. 4,009,029, West German Patent Application (OLS) Nos. 2,913,164 and 3,014,672, JP-A-54-155837 and JP-A-55-138745, hydroquinone precursors described in U.S. Pat. No. 4,201,578, other photographically useful additives or precursors thereof, etc.

LIGHT-SENSITIVE ELEMENT

In the present invention, a light-sensitive element comprising silver halide emulsion layers in combination with a dye image forming material is provided above the release layer.

Light-sensitive element, particularly a dye image forming material, and the structure of silver halide emulsion light-sensitive elements suitable for use in units as described in West German Patent Application (OLS) No. 3,735,770, are illustrated below.

DYE IMAGE FORMING MATERIAL

When the present invention is applied to color diffusion transfer, the dye image forming material is a non-diffusing compound which releases a diffusing dye (which may be a dye precursor) in connection with silver development or a compound whose diffusibility itself varies. These compounds are described in *The Theory of the Photographic Process*, fourth edition.

These compounds can be represented by the following general formula (I):

DYE-Y        (I)

wherein DYE represents a dye or a precursor thereof; and Y represents a component which gives a compound having a diffusibility different from that of the parent compound under alkaline conditions. The compounds can be roughly classified into negative type compounds which become diffusing in silver development area and positive type compounds which become diffusing in the undeveloped area depending on the function of Y.

Examples of a negative type Y include those which are oxidized by development and cleaved and release a diffusing dye.

Examples of such a negative type Y are described in U.S. Pat. Nos. 3,928,312, 3,993,638, 4,076,529, 4,152,153, 4,055,428, 4,053,312, 4,198,235, 4,179,291, 4,149,892, 3,844,785, 3,443,943, 3,751,406, 3,443,939, 3,443,940, 3,628,952, 3,980,479, 4,183,753, 4,142,891, 4,278,750, 4,139,379, 4,218,368, 3,421,964, 4,199,355, 4,199,354, 4,135,929, 4,336,322 and 4,139,389, JP-A-53-50736, JP-A-51-104343, JP-A-54-130122, JP-A-53-110827, JP-A-56-12642, JP-A-56-16131, JP-A-57-4043, JP-A-57-650, JP-A-57-20735, JP-A-53-69033, JP-A-54-130927, JP-A-56-164342, JP-A-57-119345, etc.

Among the Y negative type dye releasing redox compounds, N-substituted sulfamoyl group (N-substituted group includes a group derived from an aromatic hydrocarbon ring or a heterocyclic group) is particularly preferred. Typical examples of these Y groups include, but are not limited to, the following:

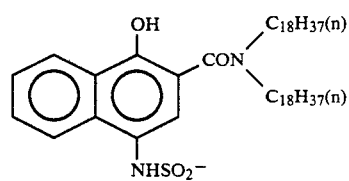

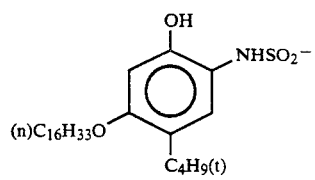

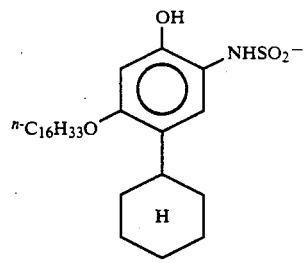

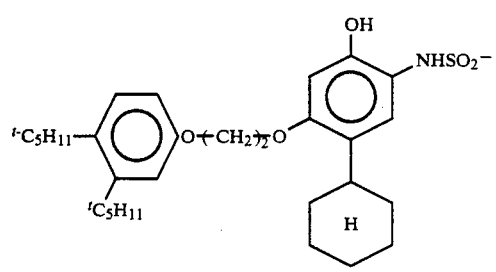

-continued

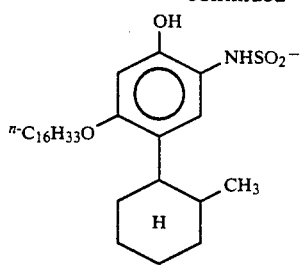

Positive type compounds are described in *Angew. Chem. Inst. Ed. Engl.*, 22,191 (1982).

Examples thereof include compounds (dye developing agents) which diffuse initially under alkaline conditions, but are oxidized by development, whereby the compounds become nondiffusing. Typical examples of Y which is effective in the compounds of this type are described in U.S. Pat. No. 2,983,606.

Examples of another type include those which release a diffusing dye by self-cyclization under alkaline conditions, but substantially release a dye when oxidized by development. Examples of Y which has this function are described in U.S. Pat. No. 3,980,479, JP-A-53-690333, JP-A-54-130927, U.S. Pat. Nos. 3,421,964 and 4,199,355.

Examples of still another type include those which themselves do not release a dye, but release a dye when reduced. The compounds of this type can be used in combination with an electron donor and react with the remaining electron donor imagewise oxidized by development, whereby a diffusing dye is released imagewise. Examples of atomic groups having this function are described in U.S. Pat. Nos. 4,183,753, 4,142,891, 4,278,750, 4,139,379 and 4,218,368, JP-A-53-110827, U.S. Pat. Nos. 4,278,750, 4,356,249 and 4,358,525, JP-A-53- 110827, JP-A-54-130927, JP-A-56-164342, Kokai Giho 87-6199, European Patent Laid-Open No. 220746A2, etc.

Examples thereof include, but are not limited to, the following groups:

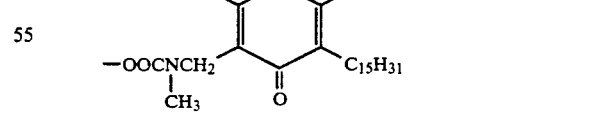

(1)

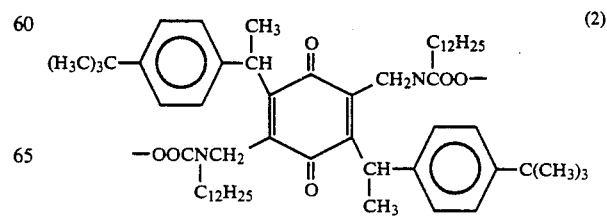

(2)

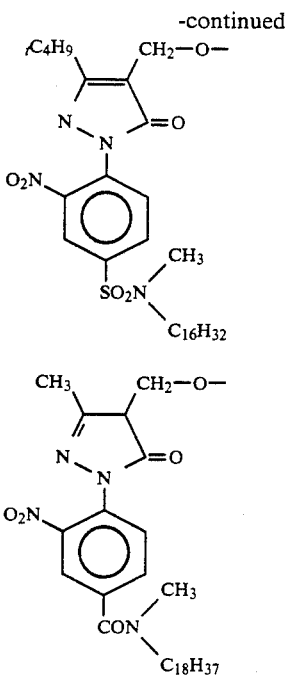

(3)

(4)

When compounds of this type are used, it is preferred that they are used in combination with nondiffusing electron donative compounds (known as ED compounds) or precursors thereof. Examples of ED compounds are described in U.S. Pat. Nos. 4,263,393 and 4,278,750, JP-A-56-138736, etc.

Examples of dye image forming materials of still another type which can be used in the present invention include the following compounds:

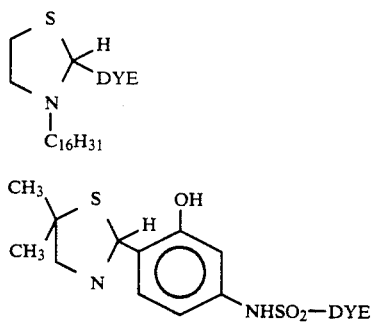

(1)

(2)

wherein DYE represents the same dye or precursor thereof, as described above.

The details thereof are described in U.S. Pat. Nos. 3,719,489 and 4,098,783.

Examples of dye represented by DYE in the above-described general formula are described in the following literature references:

(i) examples of a yellow dye include those described in U.S. Pat. Nos. 3,597,200, 3,309,199, 4,013,633, 4,245,028, 4,156,609, 4,139,383, 4,195,992, 4,148,641, 4,148,643 and 4,336,322, JP-A-51-114930, JP-A-56-71072, Research Disclosure 17630 (1978) and ibid., 16475 (1977);

(ii) examples of a magenta dye include those described in U.S. Pat. Nos. 3,453,107, 3,544,545, 3,932,380, 3,931,144, 3,932,308, 3,954,476, 4,233,237, 4,255,509, 4,250,246, 4,142,891, 4,207,104 and 4,287,292, JP-A-52-106727, JP-A-53-23628, JP-A-55-36804, JP-A-56-73057, JP-A-56-71060 and JP-A-55-134; and (iii) examples of a cyan dye include those described in U.S. Pat. Nos. 3,482,972, 3,929,760, 4,013,635, 4,268,625, 4,171,220, 4,242,435, 4,142,891, 4,195,994, 4,147,544 and 4,148,642, U.K. Patent 1,551,138, JP-A-54-99431, JP-A-52-8827, JP-A-53-47823, JP-A-53-143323, JP-A-54-99431, JP-A-56-71061, European Patents 53,037 and 53,040, Research Disclosure 17630 (1978) and ibid., 16475 (1977).

SILVER HALIDE EMULSION

Silver halide emulsions which are used in the present invention may be negative type emulsions wherein a latent image is predominantly formed on the surface of silver halide grain or internal image type direct positive emulsions wherein a latent image is predominantly formed in the interior of silver halide grain.

Internal latent image type direct positive emulsions include conversion type emulsions which are prepared by utilizing the difference in solubility between the silver halides and core/shell type emulsions which are prepared by coating at least a light-sensitive site of the inner core grains of the silver halide with an outer shell of silver halide, the inner core grains of the silver halide being doped with a metallic ion and/or being chemical-sensitized. The emulsions are described in U.S. Pat. Nos. 2,592,250 and 3,206,313, U.K. Patent 1,027,146, U.S. Pat. Nos. 3,761,276, 3,935,014, 3,447,927, 2,497,875, 2,563,785, 3,551,662 and 4,395,478, West German Patent 2,728,108 and U.S. Pat. No. 4,431,730.

When the internal latent image type direct positive emulsions are used, it is necessary that fogged nucleus is formed on the surface of grain by using a light or a nucleating agent after imagewise exposure.

Examples of the nucleating agent include hydrazines described in U.S. Pat. Nos. 2,563,785 and 2,588,982, hydrazines described in U.S. Pat. No. 3,227,552, heterocyclic quaternary salt compounds described in U.K. Patent 1,283,835, JP-A-52-69613, U.S. Pat. Nos. 3,615,615, 3,719,494, 3,734,738, 4,094,683 and 4,115,122, sensitizing dyes having a substituent group having a nucleating effect in the dye molecule described in U.S. Pat. No. 3,718,470, thiourea bonding type acylhydrazine compounds described in U.S. Pat. Nos. 4,030,925, 4,031,127, 4,245,037, 4,255,511, 4,266,013 and 4,276,363 and U.K. Patent 2,012,443 and acylhydrazine compounds to which a thioamido ring or a heterocyclic group such as triazole or tetrazole as an adsorption group, is bonded, as described in U.S. Pat. Nos. 4,080,270 and 4,278,748 and U.K. patent 2,011,391B.

In the present invention, the negative type emulsions are used in combination with the internal latent image type direct positive emulsions, and spectral sensitizing dyes are used. Examples thereof are described in JP-A-59-180550, JP-A-60-140335, Research Disclosure (RD) 17029, U.S. Pat. Nos. 1,846,300, 2,078,233, 2,089,129, 2,165,338, 2,231,658, 2,917,516, 3,352,857, 3,411,916, 2,295,276, 2,481,698, 2,688,545, 2,921,067, 3,282,933, 3,397,060, 3,660,103, 3,335,010, 3,352,680, 3,384,486, 3,623,881, 3,718,470 and 4,025,349.

STRUCTURE OF LIGHT-SENSITIVE ELEMENT

To reproduce color by subtractive color photography, a light-sensitive layer used is composed of a combination of at least two of an emulsion spectrally sensitized by the spectral sensitizing agent described hereinafter and the above-described dye image forming material which provides a dye having a spectral absorption selectively in the same wavelength region as that of the sensitizing dye.

The emulsion and the dye image forming layer may be coated in layers as separate layers or may be mixed and coated as one layer. When the coated dye image forming material has an absorption in the spectral sensitivity region of the emulsion combined with the dye image forming material, it is preferred that they are coated in as separate layers. The emulsion layer may be composed of a plurality of emulsion layers having different sensitivities. One or more layers may be optionally provided between the emulsion layer and the dye image forming material layer. For example, there may be provided a layer containing a nucleating development accelerator as described in JP-A-60-173541. A barrier layer described in JP-B-60-15267 (the term "JP-B" as used herein means an "examined Japanese patent publication") may be provided to increase the density of dye image. A reflection layer described in JP-A-60-91354 may be provided to increase the sensitivity of the light-sensitive element.

In a preferred embodiment of a multi-layer structure, a unit of a combination of blue-sensitive emulsions, a unit of a combination of green-sensitive emulsions and a unit of a combination of red-sensitive emulsions are arranged in that order from the exposure side.

If desired, a layer can be provided between the emulsion layer units. It is preferred that an interlayer is provided to prevent one emulsion layer unit from being adversely affected by the development effect of another emulsion layer.

It is preferred that the interlayer contains a nondiffusing reducing agent to prevent the oxidant of the nucleation development from being diffused when the developing agents are used in combination with a nondiffusing dye image forming material. Concretely, nondiffusing hydroquinone, sulfonamidophenol and sulfonamidonaphthol are suitable. More concretely, examples of the agent are described in JP-B-50-21249, JP-B-50-23813, JP-A-49-106329, JP-A-49-129535, U.S. Pat. Nos. 2,336,327, 2,360,290, 2,403,721, 2,544,640, 2,732,300, 2,728,659, 2,937,086, 3,637,393 and 3,700,453, U.K. Patent 557,450, JP-A-57-24941 and JP-A-58-21249. Methods for dispersing them are described in JP-A-60-238831 and JP-B-60-18978.

When compounds which release a diffusing dye by a silver ion as described in JP-B-55-7576 are used, it is preferred that the interlayer contains a compound which captures silver ions.

If desired, an irradiation-preventing layer, an isolation layer, a protective layer, etc. may be optionally provided.

PROCESSING COMPOSITION

When the present invention is applied to diffusion transfer processes, the processing composition is uniformly spread over the light-sensitive element after exposure of the light-sensitive element and cooperates with the back of the support or a light-screening layer provided on the opposite side from the processing solution of the light-sensitive layer to thereby keep the light-sensitive layer out of contact with outdoor daylight. At the same time, the light-sensitive layer is developed by ingredients contained in the processing composition. The composition contains an alkali, a thickening agent, a light-screening agent and a developing agent. Further, the composition contains a development accelerator and a restrainer to control development. In addition thereto, the composition contains an antioxidant to prevent the developing agent from deteriorating. The composition must contain a light-screening agent.

The alkali is used for adjusting the pH of the solution to from 12 to 14. Examples of the alkali include alkali metal hydroxides (e.g., sodium hydroxide, potassium hydroxide, lithium hydroxide), alkali metal phosphates (e.g., potassium phosphate), guanidines and quaternary ammonium hydroxides (e.g., tetramethylammonium hydroxide). Among them, potassium hydroxide and sodium hydroxide are preferred.

The thickening agent is used for the purpose of uniformly spreading the processing solution and keeping close contact between the light-sensitive layer and a cover sheet when the used light-sensitive layer together with the cover sheet is peeled off. Examples of the thickening agent which can be used include polyvinyl alcohol, hydroxyethyl cellulose and alkali metal salts of carboxymethyl cellulose. Hydroxyethyl cellulose and sodium carboxymethyl cellulose are preferred.

Any dye or pigment can be used as the light-screening agent, so long as it does not diffuse in the dye image receiving layer and no stain is formed. Any combination of such dyes and pigments can also be used. A typical example thereof is carbon black. Combinations of titanium white with dyes can also be used. Further, temporary light-screening dyes which become colorless after a lapse of time after processing can be used as dyes.

Any developing agent can be preferably used, so long as the dye image forming material can be cross-oxidized and no stain is substantially formed even under oxidation. Such developing agents may be used either alone or in combination of two or more. The developing agents may be used in the form of precursors thereof.

These developing agents may be contained in the appropriate layer of the light-sensitive element or in an alkaline processing solution. Concretely, such developing agents include aminophenols and pyrazolidinones. Pyrazolidinones are preferred because a stain is scarcely formed.

Examples of the pyrazolidinones include 1-phenyl-3-pyrazolidinone, 1-p-tolyl-4,4-dihydroxymethyl-3-pyrazolidinone, 1-(3'-methylphenyl)-4-methyl-4-hydroxymethyl-3-pyrazolidinone, 1-phenyl-4-methyl-4-hydroxymethyl-3-pyrazolidinone and 1-p-tolyl-4-methyl-4-hydroxymethyl-3-pyrazolidinone.

In the photographic element for use in a silver salt diffusion transfer process, a layer in which the polymer of the present invention is contained is preferably a timing layer. Only a layer containing the polymer of the present invention alone or in combination with another polymer may be used as the timing layer. Alternatively, the layer in combination with a separate timing layer (e.g., cellulose ester layer) may be used as a timing layer which is composed of two or more layers.

An image receiving element for use in a silver diffusion transfer process is coated on the support (described above) on which an image receiving layer containing a silver precipitant is carried. Such an image receiving element can be prepared by coating the support (having an optional undercoat) with a coating solution of a cellulose ester such as cellulose diacetate, the solution containing a silver precipitant dispersed therein. The resulting cellulose ester layer is hydrolyzed by an alkali to convert at least a part of the cellulose ester in the direction of depth to cellulose. In a particularly useful embodiment, a silver precipitation layer and/or a cellulose ester which is under the silver precipitation layer and does not undergo hydrolysis (for example, a part of the cellulose ester layer which contains cellulose diacetate and does not undergo hydrolysis) contains one or more mercapto compounds suitable for use in improving the color tone of the silver transferred image, stability or other photographic properties. Such mercapto compounds are introduced by diffusing them from their positions initially taken during imbibition. The image receiving element of this type is described in U.S. Pat. No. 3,607,269.

Preferred examples of the mercapto compounds include compounds described in JP-A-49-120634, JP-B-56-44418, U.K. Patent 1,276,961, JP-B-56-21140, JP-A-59-231537 and JP-A-60-122939.

The silver precipitant includes heavy metals such as iron, lead, zinc, nickel, cadmium, tin, chromium, copper, cobalt and particularly noble metals such as gold, silver, platinum and palladium. Other useful examples of the silver precipitant include sulfides and selenides of heavy metals and noble metals, particularly sulfides of mercury, copper, aluminum, zinc, cadmium, cobalt, nickel, silver, lead, antimony, bismuth, cerium, magnesium, gold, platinum and palladium and selenides of lead, zinc, antimony and nickel. Gold, platinum and palladium and sulfides thereof are particularly preferred.

It is preferred that a neutralization layer is provided between the timing layer and the support.

The above-described polymers for the neutralization layer can be used for the neutralization layer of the present invention. Preferred polymer acids include maleic anhydride copolymers such as styrene-maleic anhydride copolymer, methyl vinyl ether-maleic copolymer and ethylene-maleic anhydride copolymer and (meth)acrylic acid (co)polymers such as acrylic acid-alkyl acrylate copolymers, acrylic acid-alkyl methacrylate copolymers, methacrylic acid-alkyl methacrylate copolymers and methacrylic acid-alkyl acrylate copolymers. In addition thereto, polymers having a sulfo group such as polystyrenesulfonic acid and the acetalized product of benzaldehydesulfonic acid and polyvinyl alcohol are useful.

The neutralization layer may contain the mercapto compounds which are contained in the timing layer. Further, these polymer acids may be mixed with a hydrolyzable alkali impermeable polymer (the aforesaid cellulose ester being particularly preferred) or alkali permeable polymer to improve the physical properties of the layers.

It is preferred that an image receiving sheet has an image stabilizing layer to improve image preservability. Cationic polyelectrolytes are preferred as stabilizers therefor. Preferred examples of the cationic polyelectrolytes include water-dispersed latexes described in JP-A-59-1666940, U.S. Pat. No. 395,899, JP-A-55-142339, JP-A-54-126027, JP-A-54-155835, JP-A-53-30328 and JP-A-54-92274, polyvinyl pyridium salts described in U.S. Pat. Nos. 2,548,564, 3,148,061 and 3,756,814, water-soluble quaternary ammonium salt polymers described in U.S. Pat. No. 3,709,690 and water-insoluble quaternary ammonium salt polymers described in U.S. Pat. No. 3,898,088.

Cellulose acetate is preferred as a binder for the image stabilizing layer, and cellulose diacetate having a degree of acetylation of 40 to 49% is particularly preferred. Preferably, the image stabilizing layer is provided between the neutralization layer and the timing layer.

An acid polymer (e.g., a copolymer of methyl vinyl ether with maleic anhydride or a copolymer of methyl vinyl ether with a half ester of maleic anhydride) can be contained in the timing layer to prevent the timing time from being prolonged by a change of the cellulose ester when it is stored over a long period of time or to shorten timing time.

Further, the timing layer or the neutralization layer can contain white pigments (e.g., titanium dioxide, silicon dioxide, kaolin, zinc dioxide, barium sulfate) to prevent light from entering the inside thereof from the sectional direction of the sheet (to prevent light piping).

Optionally, an interlayer is provided between the image receiving layer and the timing layer. Preferred materials for the interlayer are gum arabic and hydrophilic polymers such as polyvinyl alcohol and polyacrylamide.

Preferred examples of methods for light screening (light shielding) include a method wherein a light screening agent(e.g., carbon black or an organic black pigment) is contained in paper used as a support and a method wherein a white pigment (e.g., titanium dioxide, silicon dioxide, kaolin, zinc dioxide or barium sulfate) is coated on the back of the support to whiten the back blackened by said light screening agent.

A hygroscopic agent such as glycerol or a layer quality improver such as polyethyl acrylate latex may be included to improve curling or brittleness.

Further, it is preferred that a protective layer is provided on the uppermost layer. A matting agent can be contained in the protective layer to improve adhesion or to impart writeability.

Examples of binders which can be used include gelatin, cellulose esters and polyvinyl alcohol.

In the present invention, preferable light-sensitive elements have a structure so that a light-sensitive silver halide emulsion layer and a protective layer on the emulsion layer are provided on one side of a support composed of a polyethylene terephthalate film containing titanium dioxide or carbon black, both sides of the film have an undercoat layer, and a carbon black layer and a protective layer on the carbon black layer are provided on side of the support opposite the emulsion layer.

In addition to the above-described layer structures, light-sensitive elements may be used having a structure in which a titanium dioxide layer, light-sensitive silver halide emulsion layers on the titanium dioxide layer and a protective layer on the emulsion layer are provided on one side of a support is composed of a polyethylene terephthalate film containing titanium dioxide or carbon black, both sides of the support have an undercoat layer, and a carbon black layer and a protective layer on said carbon black layer are provided on the other side of the support. A color dye may be used in place of or in addition to the carbon black. When polyethylene terephthalate contains carbon black and/or a color dye, the carbon black and/or color dye layer need not be provided on both sides, and titanium dioxide may be replaced by another white pigment.

Examples of the support which can be used include the above-described polyester compounds, polyethylene-laminated paper, baryta paper and cellulose triacetate.

Generally, the above-described light-sensitive silver halide emulsion layers, protective layers and carbon black layers contain a hydrophilic binder such as a gelation product.

Preferably, the silver halide emulsions comprise silver iodobromide or silver iodochlorobromide grains in a silver salt diffusion transfer process.

Silver iodobromide or silver iodochlorobromide has a silver iodide content of preferably 2 to 10 mol %, more preferably 3 to 8 mol %.

Though there is no particular limitation with regard to grain size, silver halide grains have a mean grain size (when grains are a sphere or an approximate sphere, the average of the diameters of grains is referred to as the mean grain size; when grains are cubic, the length of an edge is referred to as the grain size and the average thereof based on the projected areas of grains is referred to as the mean grain size) of preferably not more than $3\mu$, more preferably not more than $2\mu$, and particularly preferably 0.4 to $1.6\mu$.

The grain size distribution may be narrow or wide.

The silver halide grains in the silver halide emulsions may have a regular crystal form such as cube or octahedron, an irregular crystal form such as a sphere or a platy form or a composite form of these crystal forms.

Silver halide grains may have a structure such that the interior and the surface layer may be composed of different phases or a uniform phase. Any of grains can be used wherein a latent image is predominantly formed on the surface of the grain; grains wherein a latent image is predominantly formed in the interior of the grain; and grains wherein a latent image is localized neither on the surface of the grain nor in the interior of the grain. However, grain wherein a latent image is predominantly formed on the surface of the grain are preferable.

The silver halide emulsion layers have a thickness of 0.5 to $8.0\mu$, preferably 0.6 to $6.0\mu$ and are coated in such an amount as to give a coating weight of 0.1 to 3 $g/m^2$, preferably 0.2 to 1.5 $g/m^2$, in terms of silver.

The light-sensitive silver halide emulsion layers may contain various compounds to prevent fogging from being caused during the manufacture or storage of photographic materials or during processing or to stabilize photographic performance. Examples of such compounds known as anti-fogging agents or stabilizers include azoles such as benzthiazolium salts, nitroindazoles, nitrobenzimidazoles, chlorobenzimidazoles, bromobenzimidazoles, mercaptothiazoles, mercaptothiazoles, mercaptobenzthiazoles, mercaptobenzimidazoles, mercaptothiadiazoles, aminotriazoles, nitrobenztriazoles and benztriazoles (typically 1-phenyl-2-mercaptotetrazole), mercaptopyrimidines, mercaptotriazines, thioketo compounds such as oxazolinethione, azaindenes such as such as triazaindenes, tetrazaindenes and pentazaindenes (typically 4-hydroxy-6-methyl-1,3,3a,7-tetrazaindene), benzenesulfonic acids, benzenesulfinic acids, benzenesulfonamides and $\alpha$-lipoic acid.

Further examples of these compounds and the use thereof are described in U.S. Pat. Nos. 3,954,474 and 3,982,947, JP-B-52-28660, etc.

The light-sensitive element for use in a silver salt diffusion transfer process according to the present invention can be spectral-sensitized. Examples of spectral sensitizing dyes which can be preferably used in the present invention include cyanine dyes, merocyanine dyes, complex cyanine dyes, complex merocyanine dyes, holopolar cyanine dyes, hemicyanine dyes, styryl dyes and hemioxonol dyes. Particularly useful dyes are cyanine dyes, merocyanine dyes and complex merocyanine dyes. Further, combinations of two or more sensitizing dyes as described in JP-A-59-114533 and JP-A-61-163334 can be used.

The light-sensitive element for use in color and silver salt diffusion transfer process according to the present invention may contain inorganic or organic hardening agents. Examples of such hardening agents include chromium salts (e.g., chromium alum, chromium acetate), aldehydes (e.g., formaldehyde, glyoxal, glutaraldehyde), N-methylol compounds (e.g., dimethylol urea, methylol dimethylhydantoin), dioxane derivatives (e.g., 2,3-dihydroxydioxane), active vinyl compounds (e.g., 1,3,5-triacrylcyl-hexahydro-s-triazine) and mucohalogenic acids (e.g., mucochloric acid, mucophenoxychloric acid). These compounds may be used either alone or in combination.

Coating aids can be used for the silver halide emulsion layers and other hydrophilic colloid layers of the light-sensitive element of the present invention. Examples of the coating aids which can be used in the present invention include compounds described in *Research Disclosure*, Vol. 176, No. 17643, p. 26 (see, item of coating aids) (December 1978) and compounds described in JP-A-61-20035.

The silver halide emulsion layers and other hydrophilic colloid layers of the light-sensitive element for use in a silver salt diffusion transfer process according to the present invention may contain compounds such as polyalkylene oxides or ether, ester and amine derivatives thereof, thioether compounds, thiomorpholines, quaternary ammonium compounds, urethane derivatives, urea derivatives, imidazole derivatives and 3-pyrazolidones to increase sensitivity and contrast or to accelerate development. Concrete examples of such compounds are described in U.S. Pat. Nos. 2,400,532, 2,423,549, 2,716,062, 3,617,280, 3,772,021 and 3,808,003.

Preferably, the silver halide emulsion layers and other hydrophilic colloid layers of the light-sensitive element for use in a silver salt diffusion transfer process may contain dispersions of water-insoluble or difficultly water-soluble synthetic polymers to improve dimensional stability. Examples of such polymers which can be used include polymers of monomers such as alkyl (meth)acrylates, alkoxyalkyl (meth)acrylate, glycidyl (meth)acrylamides, (meth)acrylamide, vinyl esters (e.g., vinyl acetate), acrylonitrile, olefins and styrene singly or in a combination or copolymers of these monomers with a monomer such as acrylic acid, methacrylic acid, $\alpha,\beta$-unsaturated dicarboxylic acids, hydroxyalkyl (meth)acrylates and styrenesulfonic acid.

It is preferred that a protective layer is provided on the silver halide emulsion layer of the light-sensitive element for use in a silver salt diffusion transfer process. The protective layer comprises a hydrophilic polymer such as gelatin and can contain a matting agent such as polymethyl methacrylate or silica or a slip agent as described in JP-A-61-47946 and JP-A-61-75338.

The silver halide emulsion layers and other hydrophilic colloid layers of the light-sensitive element for use in a silver salt diffusion transfer process may contain dyes such as filter dyes or ultraviolet light absorbers to prevent irradiation.

Further, the light-sensitive element may contain antistatic agents, plasticizers and aerial fogging inhibitors.

The light-sensitive element for use in a silver salt diffusion transfer process may have such a structure that the light-sensitive element alone is used or the light-sensitive element and the image receiving element are provided on the same support. However, the use of the light-sensitive element alone is preferable.

Developing agents may be contained in the light-sensitive element or the processing composition element. However, it is preferred that the developing agents are contained in the processing composition.

The processing composition which can be used for a silver salt diffusion transfer process contains a base such as sodium hydroxide, potassium hydroxide, sodium carbonate or sodium phosphate and has a pH of not lower than 9, preferably an alkalinity of not lower than 11.5. The processing composition contains an antioxidant such as a salt of ascorbic acid or piperidino-hexose reductone and may contain a silver ion adjustor such as potassium bromide. Further, the processing composition may contain a viscosity increaser such as hydroxyethyl cellulose or sodium carboxymethyl cellulose.

When hydroxylamine developing agents are used in combination with the silver image receiving layer of regenerated cellulose in particular, it is especially useful for the formation of a silver-transferred image which does not require after-treatment or requires little after-treatment. Compounds represented by the following general formula are preferred as the hydroxylamine developing agents:

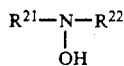

wherein at least one of $R^{21}$ and $R^{22}$ represents an alkoxyalkyl group or an alkoxyalkoxyalkyl group and the other represents an alkyl group, an alkoxyalkyl group, an alkoxyalkoxyalkyl group or an alkenyl group, each group having 1 to 4 carbon atoms. These compounds are described in U.S. Pat. Nos. 3,287,125 and 3,293,034.

Useful hydroxylamine developing agents include N,N-diethylhydroxylamine, N,N-bismethoxyethylhydroxylamine and N,N-bisethoxyethylhydroxylamine.

The hydroxylamine developing agents are used in an amount of preferably 0.1 to 40 g, more preferably 1 to 20 g per 100 g, of the processing composition.

The developing agents may be used in combination with developing agents such as 1-aryl-3-pyrazolidinone compounds or alkyl-substituted P-aminophenols described in JP-B-49-13580.

Alkali metal thiosulfates (e.g., sodium thiosulfate, potassium thiosulfate) may be used as solvents for silver halide. However, cyclic imides such as uracil, urazol and 5-methyluracil described in U.S. Pat. Nos. 3,857,274, 2,857,275 and 3,857,276 are preferred.

The processing solutions for use in a silver salt diffusion transfer process may contain other conventional auxiliary agents such as anti-fogging agents, stabilizers, image stabilizing agents, releasability improvers, etc. Particularly, 1-phenyl-2-mercaptoimidazole as stabilizer can be included. The incorporation of oxyethylamino compounds such as triethanolamine in the processing solutions is useful for the prolonging of the storage life of the processing solutions as described in U.S. Pat. No. 3,619,185. Organic phosphonic compounds such as 1-hydroxyethylidene-1,1-phosphonic acid can be used as the image stabilizing agent. Zinc compounds such as zinc nitrate can be used as the releasability improver.

Examples of light screening agents which can be added to the processing solutions include white pigments (e.g., titanium white, silicon dioxide, kaoline) and black pigments (e.g., carbon black and organic black pigments).

The processing solutions mentioned above are contained in rupturable containers to form processing elements. Any conventional rupturable container and conventional materials therefor can be used. These containers and materials are described in U.S. Pat. Nos. 3,056,491, 3,056,492, 3,173,580, 3.750,907, 3,833,831, 4,303,750 and 4,303,751.

When the layer containing the polymer of the present invention is used in diffusion transfer photography, it is preferred that the photographic element is in the form of a film unit. The photographic film unit, that is, a film unit capable of being processed by passing it between a pair of pressing members provided in parallel, comprises basically the following three elements:

(1) a light-sensitive element,
(2) an image receiving element, and
(3) a processing element (e.g., comprising a means such as a rupturable container for releasing an alkaline processing composition in the inside of the film unit and containing a silver halide developing agent).

When the present invention is applied to a color diffusion transfer process, the photographic emulsions and the image receiving layer may be coated on the same support in an integrated form, or may be coated on separate supports. The silver halide photographic emulsion layers (light-sensitive element) and the image receiving layer (image receiving element) may be provided in a combined form as a film unit, or may be individually provided as separated photographic materials. The form of the film unit may be a type which is released after development or an integrally laminated type which is integrated throughout exposure, development and the appreciation of transferred image. The film unit may be an integrated type which is released after processing as described in West German Patent Application (OLS) No. 3,735,970.

COVER SHEET AND OTHER MATERIALS

When the present invention is applied to the unit described in West German Patent Application (OLS) NO. 3,735,970, a transparent cover sheet is used to uniformly spread the processing solution over the light-sensitive element. The cover sheet is peeled off together with the processing solution and the used light-sensitive layer after processing. Accordingly, it is preferred that the surface of the cover sheet is treated or an adhesion layer is provided thereon so as to keep the close contact between the cover sheet and the processing solution. Further, a filter dye can be contained in the cover sheet to control the light sensitivity of the light-sensitive layer. The filter dye may be added directly to a support for the cover sheet or may be coated as a separate layer.

Any smooth transparent support conventionally used for photographic materials can be used as the support for the cover sheet of the present invention. Examples of the support include cellulose acetate, polystyrene, polyethylene terephthalate and polycarbonates. These supports may have an undercoat layer.

Undercoat layers conventionally used for photographic materials can be used for the supports of the present invention. The cover sheet may be provided with a layer having a neutralization function or a layer which traps a dye diffused from the side of the cover sheet.

LIGHT-SCREENING LAYER

In the units described in West German Patent Application (OLD) No. 3,735,970, the light-sensitive layers are completely kept out of the contact with outdoor daylight during development by a light-screening layer in the light-sensitive element and a light-screening processing solution spread over the light-sensitive element during processing, whereby processing under daylight is possible. Concretely, a layer containing a light-screening agent is coated on the back of the support or between the emulsion layer and the support. Alternatively, a layer containing a light-screening agent may be provided in the inside of the support. Any material having a light-screening function can be used as the light-screening agent. However, carbon black is preferable.

Any of binder can be used for the formation of the light-screening layer, so long as it can disperse carbon black. However, gelatin is preferable.

The light screening (light shielding) of the light-sensitive material in the film unit described in West German Patent Application (OLS) No. 3,735,970 is made in such a manner that the light screening of one side (surface) of the light-sensitive layer is made by spreading the processing composition having a light-screening function, and the light screening of other side (surface) of the light-sensitive material is made by providing a layer containing a light-screening agent (a) between the light-sensitive layer and the white support, (b) in the white support itself and/or (c) on the back (the opposite side to the light-sensitive layer) of the white support. Light screening may be made on each of (a), (b) and (c) even though each light screening function is insufficient alone. Light screening only on (c) is preferable.

The present invention is now illustrated in greater detail by reference to the following examples which, however, are not to be construed as limiting the invention in any way.

EXAMPLE 1

A transparent polyethylene terephthalate support was coated with an acetone solution of the copolymers (3) and (8) of the present invention in such an amount as to give a coating weight of 4.0 g/m$^2$ on a solid basis, thus forming each of coated films A-1 and A-2, respectively.

Coated films B-1, B-2, B-3, C-1 and C-2 as comparative coated films were formed in the same manner as in the formation of the coated film A-1 except that each of the following polymers (a), (b), (c) and blends (d) and (e) was used in place of the copolymer (3) of the coated film A-1:

(a) cellulose acetate having a degree of acetylation of 55.5% (the weight of acetic acid released by hydrolysis being 0.555% per one g of a sample);

(b) methacrylic acid/methyl methacrylate/phthalimidomethyl acrylate copolymer (26.7/46.6/26.6 by weight);

(c) acrylic acid/methyl methacrylate/hydroxymethyl methacrylate copolymer (33.3/20.0/46.7 by weight);

(d) blend of the polymers (a) and (b) (7:3 by weight; coating weight of the polymer (a) being 2.8 g/m$^2$ and that of the polymer (b) being 1.2 g/m$^2$, the apparent composition of the blend being equal to the copolymer (3)); and (e) blend of the polymers (a) and (c) (7:3 by weight; coating weight of the polymer (a) being 2.8 g/m$^2$ and that of the polymer (c) being 1.2 g/m$^2$, the apparent composition of the blend being equal to the copolymer (8)).

The surface profile of each coated film was visually observed. Evaluation was made as to whether the film was transparent or cloudy.

The results are shown in Table 1.

TABLE 1

| Coated film | Surface profile of coated film |
|---|---|
| Invention A-1 | transparent |
| Invention A-2 | transparent |
| Comp. Ex. B-1 | transparent |
| Comp. Ex. B-2 | transparent |
| Comp. Ex. B-3 | transparent |
| Comp. Ex. C-1 | cloudy |
| Comp. Ex. C-2 | cloudy |

It is apparent from Table 1 that the copolymers of the present invention can form coated films having good compatibility without becoming cloudy as do the films of the blends.

EXAMPLE 2

An image receiving sheet 1-1 having the following structure was prepared.

PAPER SUPPORT

Both sides of paper of 150μ in thickness were laminated with polyethylene, the thickness of each side of the laminated polyethylene being 30μ. Polyethylene on the image receiving layer side contained about 10% by weight (based on the weight of polyethylene) of titanium oxide dispersed therein.

IMAGE RECEIVING LAYER SIDE

A composite of:

(1) a neutralization layer containing an acrylic acid polymer (4 g/m$^2$) and polyvinyl alcohol having a degree of saponification of 88 mol % (6 g/m$^2$);

(2) a layer containing the copolymer (3) (4.0 g/m$^2$), restrainer precursor 1,3-bis{2-(1-phenyltetrazolyl-5-thio)ethylsulfonyl}-2-hydroxypropane (0.1 g/m$^2$) and the following compound (0.15 g/m$^2$) as a crosslinking agent,

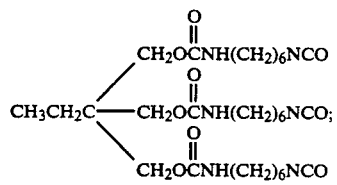

(3) an image receiving layer containing the following polymer (3.0 g/m$^2$) and gelatin (3.0 g/m$^2$),

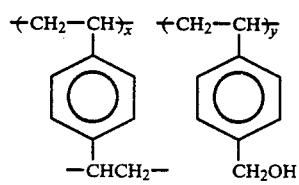

-continued

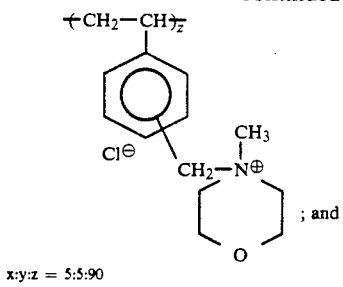

x:y:z = 5:5:90

(4) a release layer containing an acrylic acid-butyl methacrylate copolymer (85:15 by mol, 40 mg/m²).

BACK LAYER

A composite of:
(1) a light screening layer containing carbon black (3.0 g/m²) and gelatin (4.0 g/m²);
(2) a white layer containing titanium oxide (3.0 g/m²) and gelatin (1.0 g/m²); and
(3) a protective layer containing gelatin (0.6 g/m²).

Image receiving sheets 1-2 and 1-3 were prepared in the same manner as in the preparation of the image receiving sheet 1-1 except that each of the graft copolymers (4) and (8) was used in place of the copolymer (3).

Image receiving sheets 2-1 and 2-2 as comparative image receiving sheets were prepared in the same manner as in the preparation of the image receiving sheet 1-1 except that each of the following polymers (a) and (b) was used in place of the copolymer (3):
(a) methacrylic acid/methyl methacrylate/phthalimidomethyl acrylate copolymer (10/82/8 by weight); and
(b) acrylic acid/methyl methacrylate/hydroxymethyl methacrylate copolymer (10/76/14 by weight)

An image receiving sheet 3 as a comparative image receiving sheet was prepared in the same manner as in the preparation of the image receiving sheet 1-1 except that cellulose acetate having a degree of acetylation of 55.5% (4.0 g/m²) and a styrene-maleic anhydride (1:1 by mol) copolymer having an average degree of polymerization of about 10,000 (0.4 g/m²) were used in place of the copolymer (3) of the image receiving sheet 1-1.

Further, an image receiving sheet 4 having the following structure as a comparative image receiving sheet was prepared.

IMAGE RECEIVING SHEET 4

Paper Support

The same paper support as that of the image receiving sheet 1-1.

IMAGE RECEIVING LAYER SIDE (1') the same neutralization layer as that of (1);
(2') the same layer as that of (2) except that cellulose acetate having a degree of acetylation of 51.3% (4.0 g/m²) and a styrene-maleic anhydride (1:1 by mol) copolymer having an average degree of polymerization of about 10,000 (0.4 g/m²) were used in place of the copolymer (3) and the amount of the restrainer precursor was changed to 0.3 g/m²;
(3') a layer containing 5:5 (on a solid basis) blend (2.5 g/m² on a solid basis) of polymer latex obtained by emulsion polymerizing styrene/butyl acrylate/acrylic acid/N-mehylol acrylamide in a ratio by weight of 49.7/42.3/4/4 and polymer latex obtained by emulsion polymerizing methyl methacrylate/acrylic acid/N-methylol acrylamide in a ratio by weight of 93/3/4 and 0.16 g/m² of sodium salt of 2-hydroxy-4,6-dichloro-1,3,5-triazine (as a hardening agent);
(4') the same image receiving layer as that of the layer (3); and
(5') the same release layer as that of the layer (4).

BACK LAYER

The same back layer as that of the image receiving sheet 1-1.

A transparent polyethylene terephthalate support was coated with the following layers to prepare a light-sensitive sheet:

BACK LAYER a light-screening layer containing carbon black (4.0 g/m²) and gelatin (2.0 g/m²);

EMULSION LAYER SIDE (1) a layer containing the following cyan dye releasing redox compound (0.44 g/m²), tricyclohexyl phosphate (0.09 g/m²), 2,5-t-pentadecylhydroquinone (0.008 g/m²) and gelatin (0.8 g/m²),

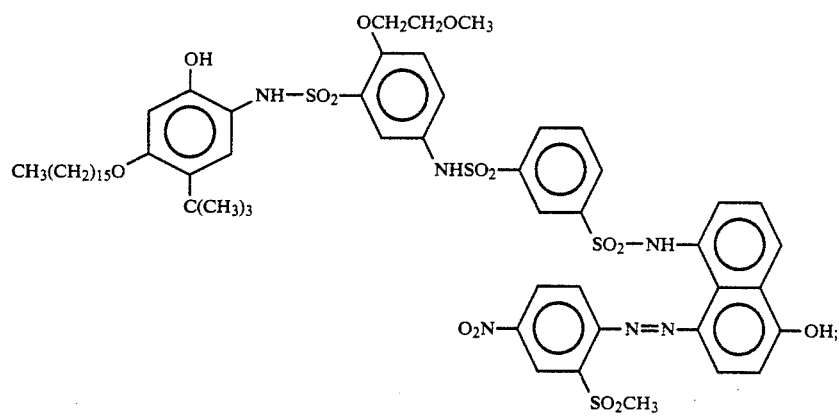

(2) a red-sensitive emulsion layer containing a red-sensitive internal latent image type direct positive silver bromide emulsion (1.03 g/m² in terms of silver), gelatin (1.2 g/m²), the following nucleating agent (0.04 mg/m²)

and sodium salt of 2-sulto-5-n-pentadecyl-hydroquinone (0.13 g/m²),

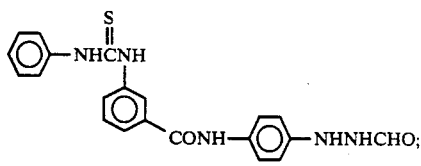

(3) a layer containing 2,5-di-t-pentadecylhydroquinone (0.43 g/m²), trihexyl phosphate (0.1 g/m²) and gelatin (0.4 g/m²);

(4) a layer containing the following magenta dye releasing redox compound having the following structural formula I (0.21 g/m²), the following magenta dye releasing redox compound having the following structural formula II (0.11 g/m²), tricyclohexyl phosphate (0.08 g/m²), 2,5-di-t-pentadecylhydroquinone (0.009 g/m²) and gelatin (0.9 g/m²),

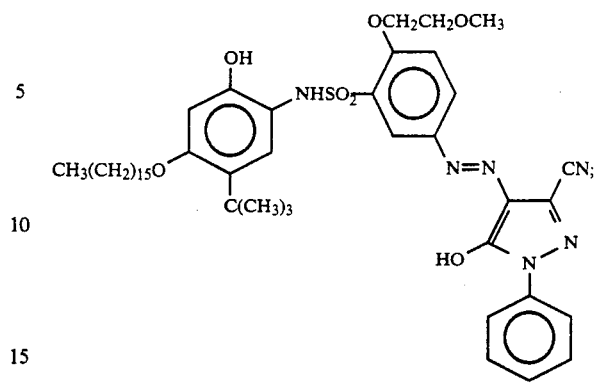

(8) a blue-sensitive emulsion layer containing blue-sensitive internal latent image type direct positive silver bromide emulsion (1.09 g/m² in terms of silver), gelatin (1.1 g/m²), the same nucleating agent (0.04 g/m²) as Structural formula I

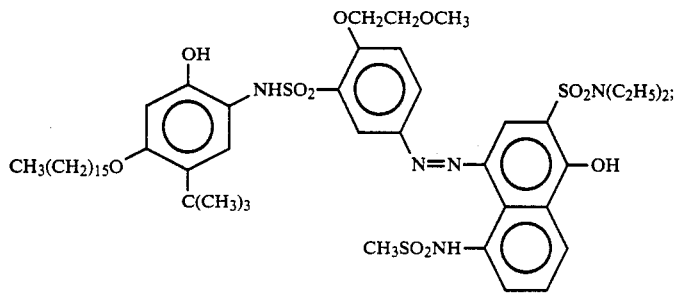

Structural formula II

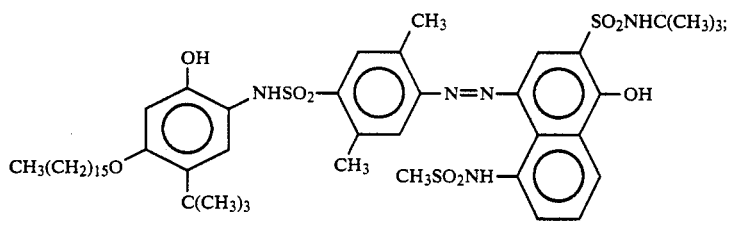

(5) a green-sensitive emulsion layer containing a green-sensitive internal latent image type direct positive silver bromide emulsion (0.82 g/m² in terms of silver), gelatin (0.9 g/m²), the same nucleating agent (0.003 mg/m²) as that of the layer (2) and a sodium salt of 2-sulfo-5-n-pentadecylhydroquinone (0.08 g/m²);

(6) the same layer as (3);

(7) a layer containing the following yellow dye releasing redox compound (0.53 g/m²), tricyclohexyl phosphate (0.13 g/m²), 2,5-di-t-pentadecylhydroquinone (0.014 g/m²) and gelatin (0.7 g/m²), that of the layer (2) and sodium salt of 2-sulfo-5-n-pentadexylhydroquinone (0.07 g/m²); and (9) a layer containing gelatin (1.0 g/m²).

| Processing solution | |
|---|---|
| 1-p-Tolyl-4-hydroxymethyl-4-methyl-3-pyrazolidone | 8.0 g |
| Methylhydroquinone | 0.1 g |
| 5-Methylbenztriazole | 5.0 g |
| Sodium sulfite (anhydrous) | 2.0 g |
| Hydroxyethyl cellulose | 40 g |
| Potassium hydroxide | 56 g |
| Benzyl alcohol | 2.0 g |
| Add water to make total amount | 1 kg |

The above light-sensitive sheet was exposed through a color test chart and then put upon each of the image receiving sheets 1-1, 1-2, 1-3, 2-1, 2-2, 3 and 4. The above-described processing solution was spread between both sheets, the thickness of the processing solution spread being 65μ (the spreading was conducted with the aid of pressure rollers).

The light-sensitive sheet and the image receiving sheet were peeled from each other 3 minutes after processing at 15° C. and one minute after processing at 35° C.

Maximum density ($D_{max}$) and minimum density ($D_{min}$) at each processing temperature are shown in Table 2.

In the image receiving sheets 1-1 to 1-3 of the present invention, a difference in $D_{max}$ between the low-temperature processing (15° C.) and the high-temperature processing (35° C.) is slight in comparison with that of the comparative image receiving sheets 2-1, 2-2 and 2-3. In the sheets of the present invention, $D_{min}$ is not raised during the high-temperature process, while $D_{max}$ of the comparative image receiving sheet 3 is increased. Accordingly, the sheets of the present invention are excellent in processing temperature characteristics.

The image receiving sheets 1-1 to 1-3 of the present invention and the comparative image receiving sheet 4 are on the same level with regard to processing temperature characteristics. However, the timing layer of the comparative image receiving sheet 4 is a two-layer structure, while the timing layer of the present invention is a single layer structure. Accordingly, the present invention has an advantage in manufacturing costs.

TABLE 2

| Image receiving sheet | 15° C. | | | | | | 35° C. | | | | | |
|---|---|---|---|---|---|---|---|---|---|---|---|---|
| | B | | G | | R | | B | | G | | R | |
| | $D_{max}$ | $D_{min}$ | $D_{max}$ | $D_{min}$ | $D_{max}$ | $D_{min}$ | $D_{max}$ | $D_{min}$ | $D_{max}$ | $D_{min}$ | $D_{max}$ | $D_{min}$ |
| Invention 1-1 | 1.95 | 0.09 | 2.41 | 0.12 | 2.70 | 0.23 | 1.99 | 0.09 | 2.41 | 0.13 | 2.79 | 0.23 |
| Invention 1-2 | 1.98 | 0.08 | 2.41 | 0.12 | 2.76 | 0.22 | 1.94 | 0.09 | 2.26 | 0.13 | 2.69 | 0.23 |
| Invention 1-3 | 1.90 | 0.09 | 2.28 | 0.13 | 2.62 | 0.23 | 1.89 | 0.09 | 2.36 | 0.14 | 2.72 | 0.23 |
| Comp. Ex. 2-1 | 2.07 | 0.10 | 2.39 | 0.13 | 2.72 | 0.23 | 1.92 | 0.09 | 2.10 | 0.12 | 2.66 | 0.22 |
| Comp. Ex. 2-2 | 2.02 | 0.09 | 2.49 | 0.13 | 2.69 | 0.23 | 1.90 | 0.09 | 2.18 | 0.13 | 2.44 | 0.23 |
| Comp. Ex. 3 | 1.70 | 0.10 | 2.12 | 0.15 | 2.42 | 0.23 | 1.90 | 0.14 | 2.19 | 0.18 | 2.48 | 0.24 |
| Comp. Ex. 4 | 1.99 | 0.09 | 2.45 | 0.12 | 2.77 | 0.23 | 1.94 | 0.09 | 2.32 | 0.13 | 2.74 | 0.23 |

EXAMPLE 3

The image receiving sheets of Example 2 were processed in the same manner as in Example 2 (25° C. 90 sec peeling). The processed image receiving sheets were left to stand at 25° C. and 50% RH to dry them. The image receiving sheets were left to stand at 25° C. and 30% RH for 2 hours and pressed against a cylindrical rod of 10 mm in diameter under these conditions so as to allow the back of the sheet to be brought into contact with the rod. The sheets were bent through 180 degrees for a period of about one second. The bent part was examined by the naked eye, and cracking of the coated film on the image receiving side of the image receiving sheet was observed. The results are shown in Table 3.

TABLE 3

| Image receiving sheet | Cracking |
|---|---|
| Invention 1-1 | not cracked |
| Invention 1-2 | not cracked |
| Invention 1-3 | not cracked |
| Comp. Ex. 2-1 | cracked |
| Comp. Ex. 2-2 | cracked |
| Comp. Ex. 3 | not cracked |
| Comp. Ex. 4 | not cracked |

It is apparent from Table 3 that the image receiving sheets of the present invention are not cracked and can withstand bending, while the comparative image receiving sheets are cracked. This suggests that the coated films of the image receiving sheets of the present invention are not brittle and are excellent in resistance to bending.

It will be understood that when copolymers of the present invention are used, there can be obtained photographic elements which are excellent in processing temperature characteristics as well as in resistance to bending, even though the temporary barrier layer thereof is composed of a single layer structure.

While the invention has been described in detail and with reference to specific embodiments thereof, it will be apparent to one skilled in the art that various changes and modifications can be made therein without departing from the spirit and scope thereof.

What is claimed is:

1. A photographic element comprising a support having thereon at least one layer comprising a polymer obtained by copolymerizing a repeating unit represented by the following general formula (I) and a copolymerizable oil-soluble cellulose derivative represented by the following general formula (II),

wherein A represents a repeating unit derived from an ethylenically unsaturated monomer having —COOH group, —SO$_3$H group or —PO(OH)$_2$ group in the molecular structure; and B represents a repeating unit derived from a copolymerizable ethylenically unsaturated monomer;

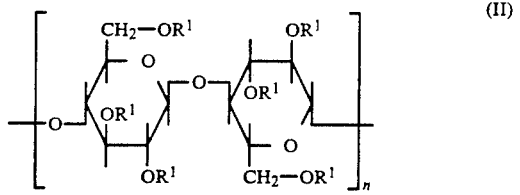

wherein (R$^1$)s each independently represents (i) a hydrogen atom, (ii) a monovalent organic bonding group selected from the group consisting of an ester group and an ether group or (iii) a monovalent organic bonding group represented by the following general formula (III), with the provisos that (R$^1$)s do not represent all hydrogen atom at the same time and at least one R$^1$ is represented by formula (III); and n represents a number of 20 to 800;

wherein $R^2$ represents a hydrogen atom or an alkyl group having 1 to 6 carbon atoms; and L represents a bivalent organic bonding group, and wherein the percentage by weight of the component represented by general formula (I) in the copolymer is from 5 to 95; the percentage by weight of the component represented by general formula (III) based on the weight of the component represented by general formula (II) is from 0.00001 to 10; x and y each represents the percentage by weight of each monomer component in the copolymer, and x is in the range of 1 to 95 and y is in the range of 5 to 99.

2. The photographic element of claim 1, wherein x is from 5 to 80 and y is from 20 to 95.

3. The photographic element of claim 1, wherein the cellulose derivative is an acetylated cellulose derivative, an acetylbutylated cellulose derivative, an acetylpropionated cellulose derivative, or an ethylated cellulose derivative.

4. The photographic element of claim 1, wherein $R^2$ is a hydrogen atom or a methyl group.

5. The photographic element of claim 1, wherein $R^2$ is a hydrogen atom and L is a CO— group.

6. The photographic element of claim 1, wherein $R^2$ is a methyl group and L is a CO— group or a COOCH$_2$CH$_2$NHCO— group.

* * * * *